(12) United States Patent
Azumai

(10) Patent No.: US 7,436,542 B2
(45) Date of Patent: Oct. 14, 2008

(54) MANAGEMENT SYSTEM OF IMAGE FORMING DEVICE

(75) Inventor: Mitsuo Azumai, Hachioji (JP)

(73) Assignee: Konica Minolta Business Technologies Inc., Tokyo (JP)

( * ) Notice: Subject to any disclaimer, the term of this patent is extended or adjusted under 35 U.S.C. 154(b) by 973 days.

(21) Appl. No.: 10/773,369

(22) Filed: Feb. 5, 2004

(65) Prior Publication Data
US 2004/0252391 A1 Dec. 16, 2004

(30) Foreign Application Priority Data
May 26, 2003 (JP) ............................... 2003-147900

(51) Int. Cl.
*G06F 15/00* (2006.01)
(52) U.S. Cl. ...................... 358/1.9; 358/1.15; 358/1.16; 358/406; 358/448; 358/504; 399/8; 382/112
(58) Field of Classification Search ................. 358/1.15, 358/1.9, 1.16, 406, 434, 448, 504; 399/8, 399/9, 14, 15; 382/112
See application file for complete search history.

(56) References Cited

U.S. PATENT DOCUMENTS 6,693,752 B2 * 2/2004 Azumai ...................... 359/896
6,724,381 B2 * 4/2004 Sakashita .................... 345/213
6,937,364 B2 * 8/2005 Suzuki ....................... 358/1.9
2003/0132902 A1 * 7/2003 Miyamoto ................... 345/87

FOREIGN PATENT DOCUMENTS

JP 10-162138 6/1998

* cited by examiner

*Primary Examiner*—Edward L. Coles
*Assistant Examiner*—Chan S Park
(74) *Attorney, Agent, or Firm*—Frishauf, Holtz, Goodman & Chick, P.C.

(57) ABSTRACT

An management system of an image forming device, which is structured by the image forming device and a management device for managing the image forming device through a communication network; the management device comprising a communication unit for sending a data of a computing parameter for conducting an image processing and a data of a set value indicating a computing procedure of the image processing, to the image forming device; the image forming device comprising: an image processing circuit for conducting the predetermined image processing for an image data; and an operating frequency measurement unit for measuring an operating frequency of the image processing circuit; wherein the image forming device conducts an operating test of the image processing circuit by the operating frequency measurement unit on the basis of the sent data, and sends a test result of the operating test to the management device.

6 Claims, 21 Drawing Sheets

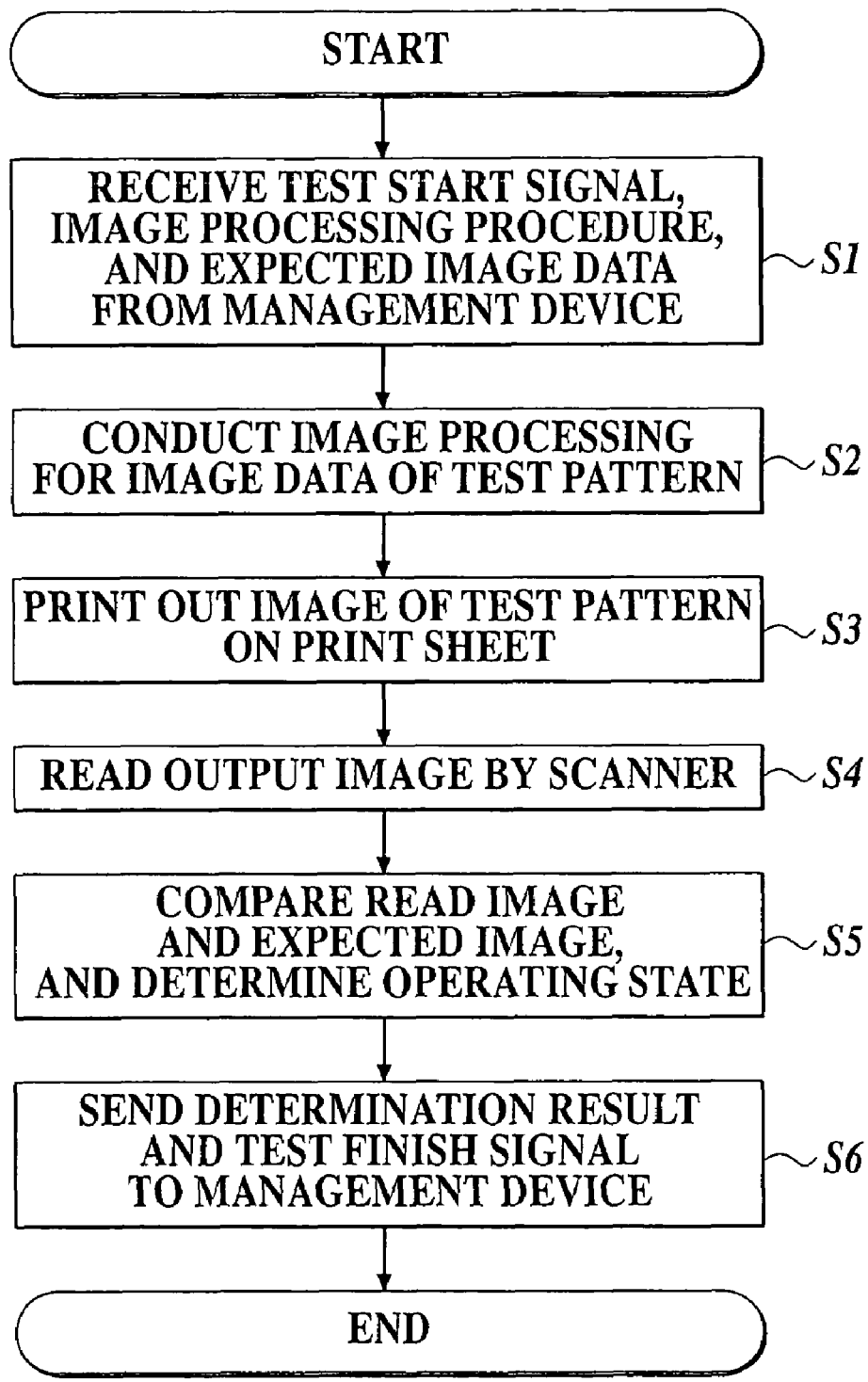

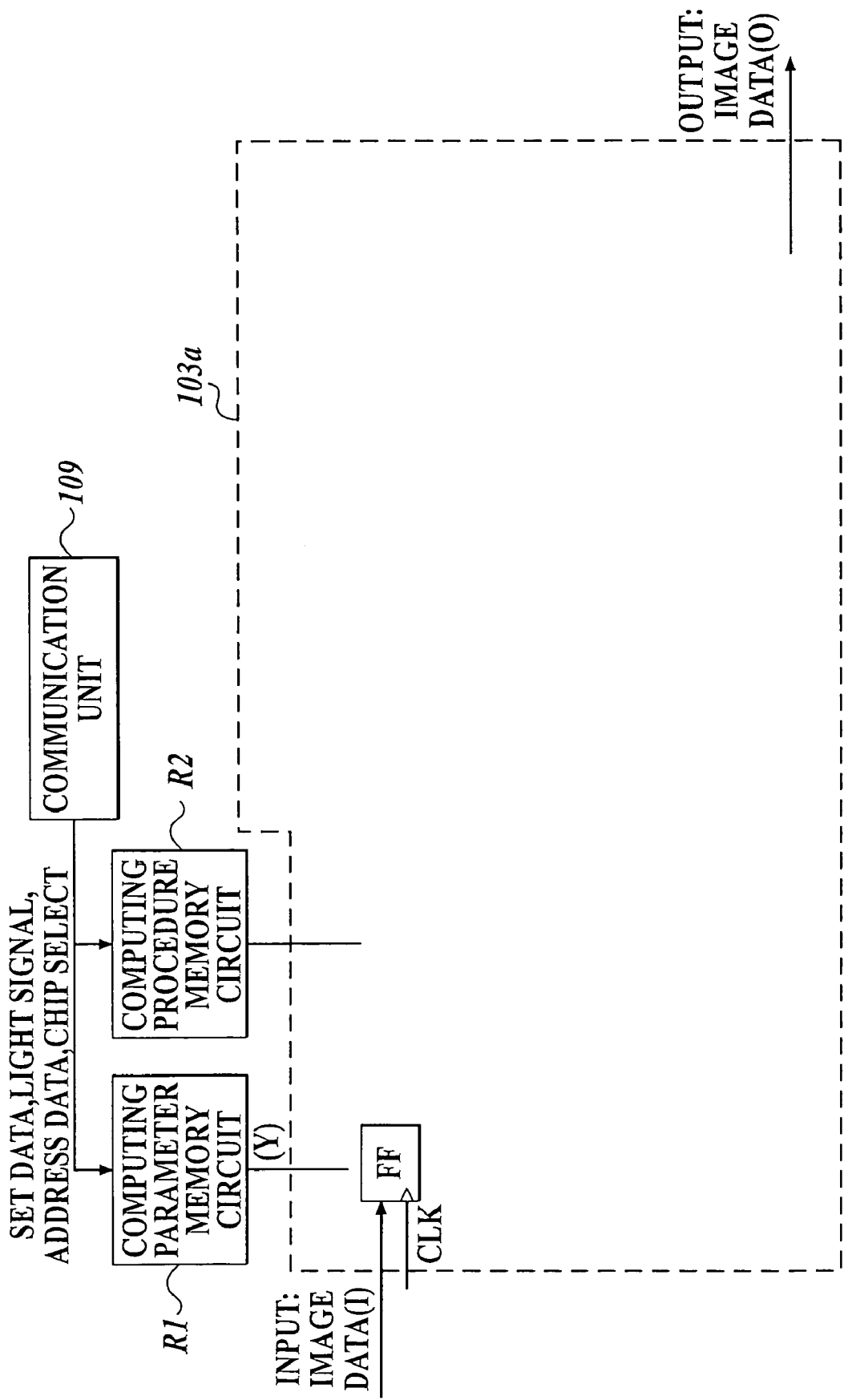

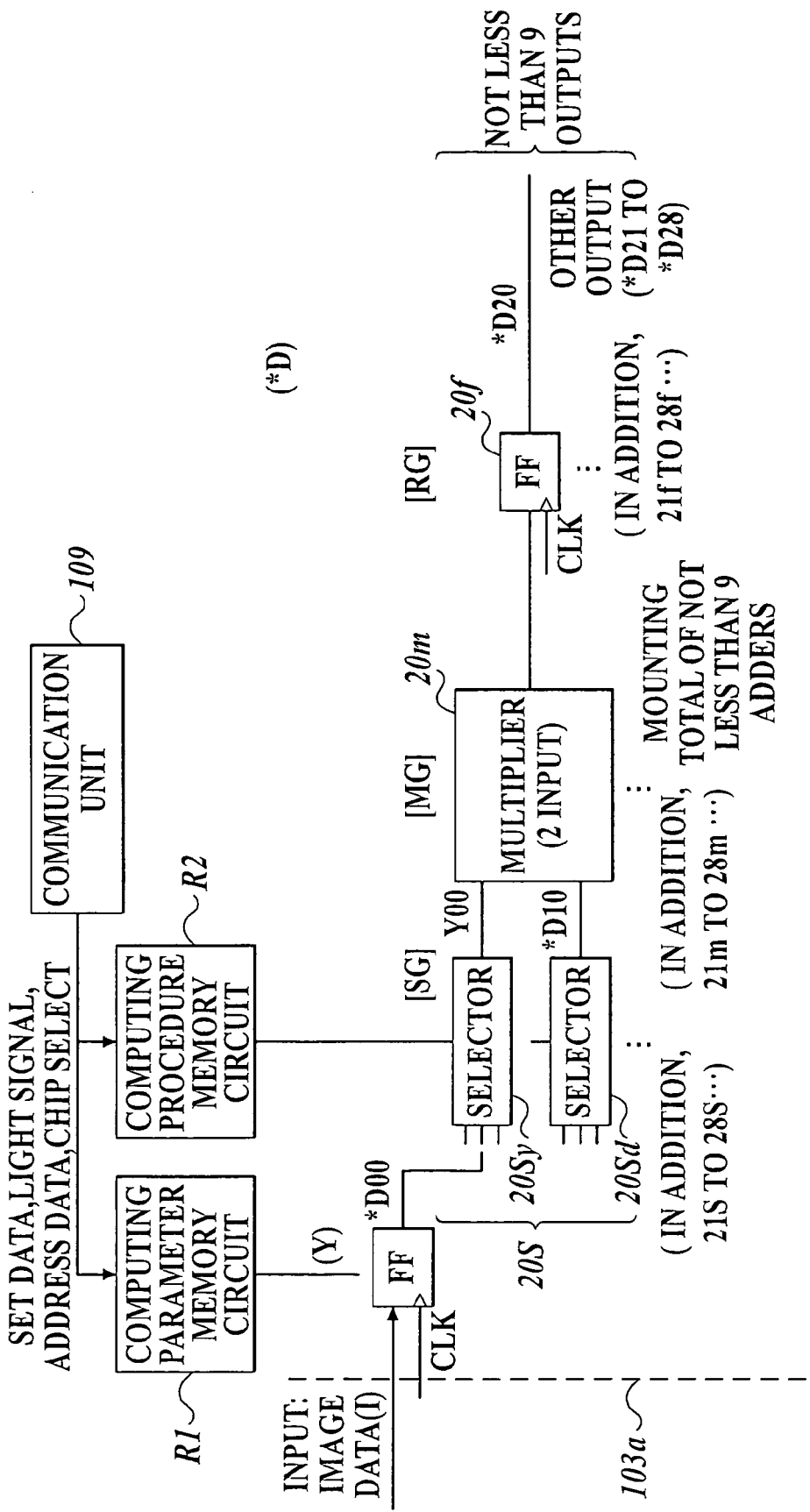

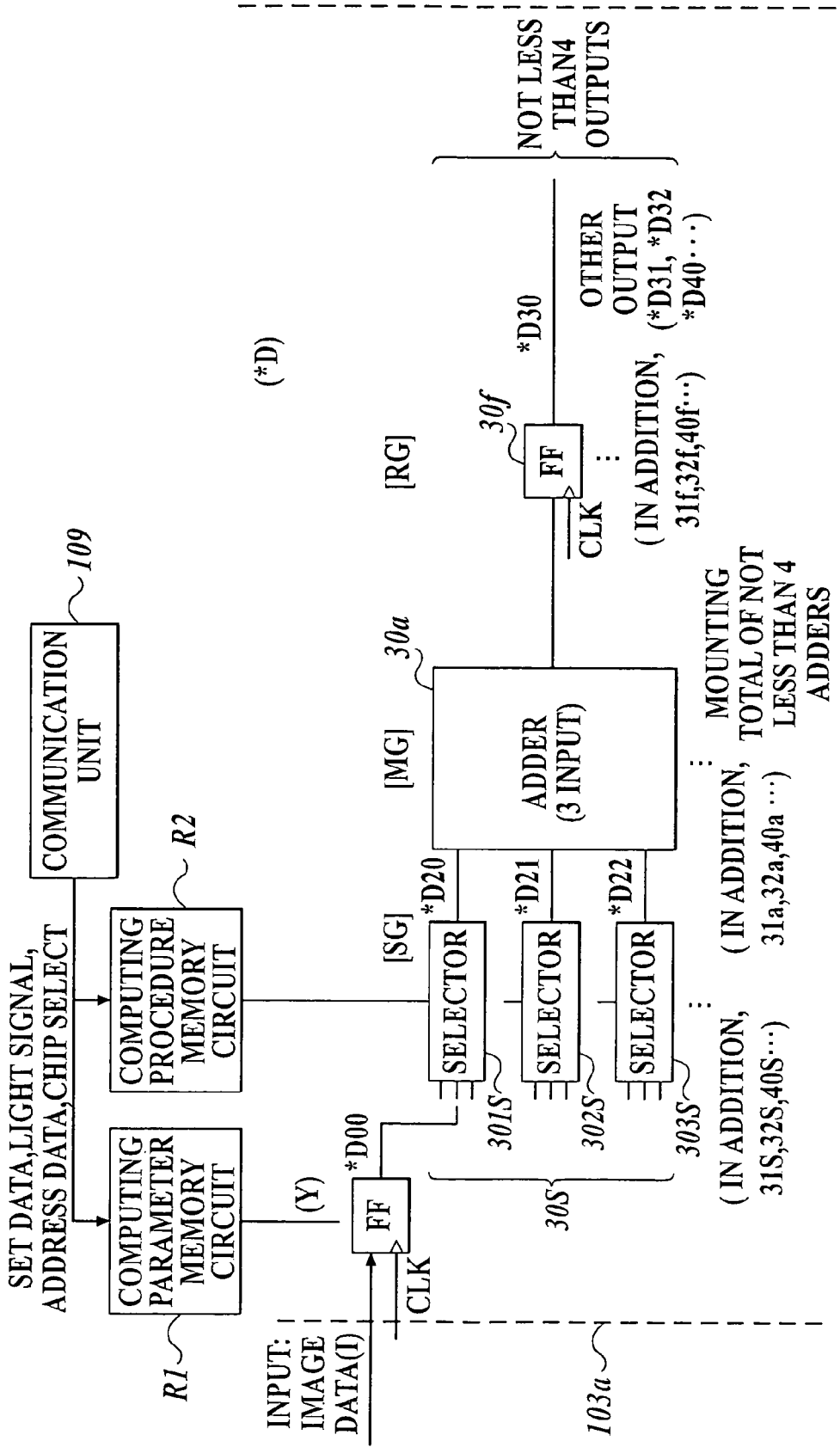

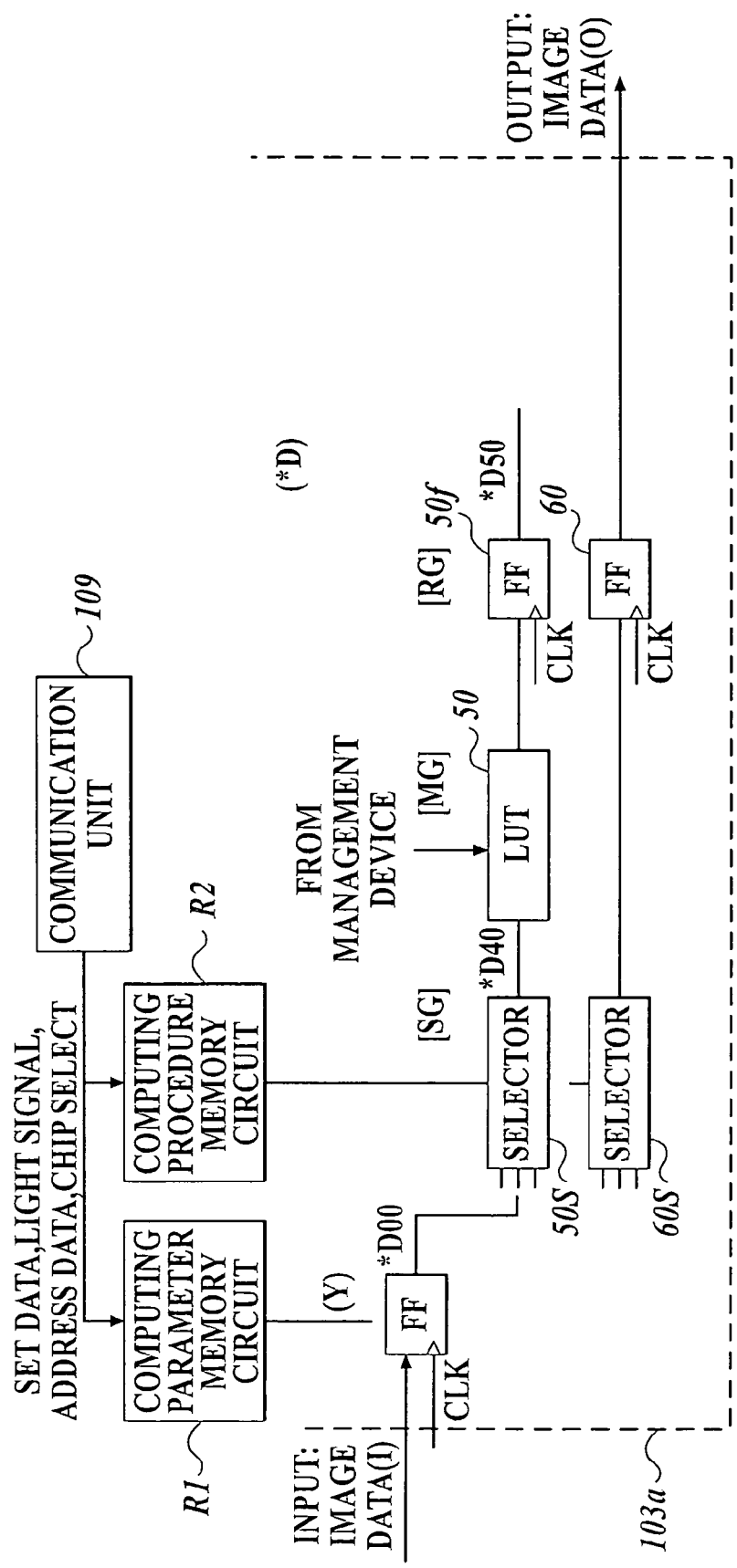

SET DATA

ADDRESS

LIGHT SIGNAL
(NEGATIVE LOGIC)

INPUT IMAGE DATA

CLK

REFERENCE CLOCK

DL19

DL20

DL21

DL22

DL23

DL24

DL25

DL46

DL47

DL48

DL49

DL50

DL51

FIG.14A
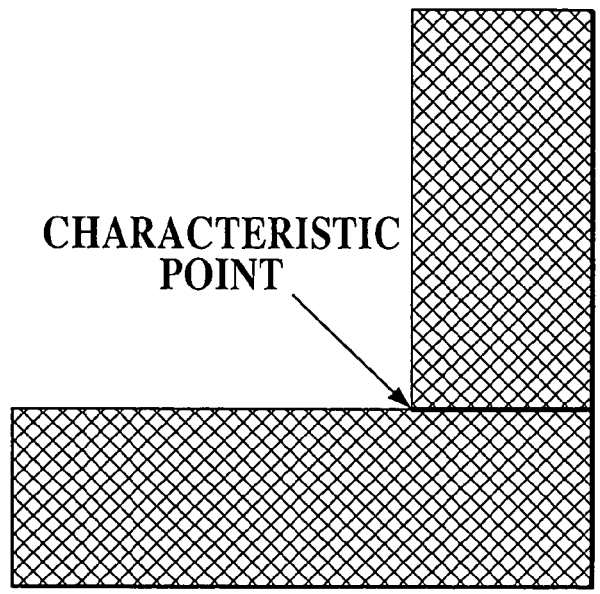
CHARACTERISTIC POINT
FIG.14B
MAIN SCANNING DIRECTION
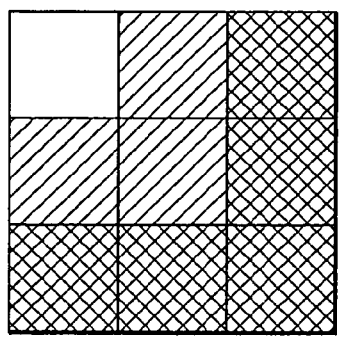
☐ : ZERO DENSITY(WHITE)
▨ : HALFTONE DENSITY
▩ : FULL DENSITY(BLACK)

IMAGE END PORTION

IMAGE END PORTION

MANAGEMENT SYSTEM OF IMAGE FORMING DEVICE

BACKGROUND OF THE INVENTION

1. Field of the Invention

This invention relates to a management system of an image forming device, which is structured by an image forming device and a management device. The management device manages the image forming device through a communication network.

2. Description of Related Art Generally, in the image processing (filter computing, color conversion or the like) in the image forming device such as a copy, the RAM capacity and the circuit scale are large and the digital circuit such as ASIC (Application Specific Integrated Circuit) is applied without using the soft processing by CPU, FPGA (Field Programmable Gate Array), and CPLD (Complex Programmable Logic Device). Because ASIC for the image processing is a wide-scale circuit, the development cost of Several ten-million yen and the several experimental periods are necessary. Further, when such ASIC is designed, a versatile design is required so that the parameter necessary for various computings can be set as an optional value (JP-Tokukaihei-10-162138A).

However, if such ASIC was mounted in the copy and the image quality evaluation was conducted after ASIC for the image processing was developed, due to a mechanical problem, a processing problems or the like, the experimental period of several months and a colossal cost for a renewal development and personnel were problem when a negligible change such as the change of the computing algorithm of the image processing or the like was necessary. To solve these problems, it is considered that the circuit for the image processing is structured so that the function change can be conducted thereto in accordance with necessity. On the other hand, after the shipment of the copy such as the image forming device, the copy could be used even if it is not normally operated by a mechanical characteristic, an aged deterioration of the process characteristic, an aged deterioration of the components, a malfunction or the like. Further, even if the function change of the described image forming circuit is conducted, there is no guarantee that the preferred operation is absolutely conducted. To avoid this problem, the operating test of the copy may be conducted on regular basis, after the function change, or the like. However, because of a system that each copy disposed in a office and a school was tested by hand, a time-consuming trouble and a colossal cost such as making the system that an expert service staff is dispatched even in the operating test of the copy were necessary. Further, when the function change of the image forming circuit was conducted in accordance with necessity, a time-consuming trouble and a colossal cost were problem.

SUMMARY OF THE INVENTION

An object of the present invention is to allow the function change of the image processing circuit in the image forming device to be conducted through the communication network by remote access, and the operating test for checking whether the image forming device normally operates to be conducted on the basis of this function change, an aged deterioration or the like.

In order to solve the above problems, in accordance with a first aspect of the invention, an management system of an image forming device, which is structured by the image forming device and a management device for managing the image forming device through a communication network;

the management device comprising a communication unit for sending a data of a computing parameter for conducting an image processing and a data of a set value indicating a computing procedure of the image processing, to the image forming device;

the image forming device comprising:
an image processing circuit for conducting the predetermined image processing for an image data; and
an operating frequency measurement unit for measuring an operating frequency of the image processing circuit; the image processing circuit comprising:
a plurality of computing modules for conducting the predetermined image processing;
a plurality of output storage circuits connected with each of output stages of the computing modules, the output storage circuits reading and storing an output data from each of the computing modules on a timing of a signal change of a clock signal;
a computing parameter memory circuit for memorizing the data of the computing parameter sent from the management device;
a computing procedure memory circuit for memorizing the data of the set value indicating the computing procedure sent from the management device; and
a selector connected with each of input stages of the computing modules, the selector selectively choosing a data from among a targeted image data of the image processing, the data indicating the computing parameter, and each of the output data of the output storage circuits, in accordance with the set value of the computing procedure stored in the computing procedure memory circuit, and outputting a chosen data to the computing module connected with rearward stages;
the operating frequency measurement unit comprising:
a clock generation unit for generating a clock signal having an optional frequency, for operating the image processing circuit; and
a clock operation determination unit for determining whether the image processing circuit normally operates by the clock signal generated by the clock generation unit;

wherein the image forming device conducts an operating test of the image processing circuit by the operating frequency measurement unit on the basis of the data of the computing parameter and the data of the set value indicating the computing procedure, and sends a test result of the operating test to the management device.

Preferably, the test result of the operating test is a maximum operating frequency which is operable in the image processing circuit.

Further, the management device may comprise an information storage unit for storing information related to various operating tests which is conducted in the image forming device; and a toll computing unit for computing a management expense imposed on the image forming device on the basis of the information stored in the information storage unit.

In accordance with a second aspect of the invention, an management system of an image forming device, which is structured by the image forming device and a management device for managing the image forming device through a communication network;

the management device comprising a communication unit for sending a signal designating an operating test to the image forming device;

the image forming device comprising:
a image processing circuit for conducting a predetermined image processing for an image data for test in accordance with an operating test designation signal from the management device;
an image forming unit for conducting an image forming on the basis of the image data for test in which the image processing is conducted; and
a read unit for reading an image formed by the image forming unit;
the image processing circuit comprising:
a characteristic point detection unit for detecting a characteristic point of the image from the image read by the read unit;
a displacement computing unit for computing an amount of a displacement of the image from the characteristic point of the image detected by the characteristic point detection unit; and a correction processing unit for conducting a processing for correcting the amount of the displacement of a targeted image of a print out on the basis of the amount of the displacement computed by the displacement computing unit.

Preferably, the image forming unit has a photo conductor, and the image formed by the image forming unit is a toner image formed on the photo conductor.

Preferably, the read unit reads the toner image on the photo conductor.

Preferably, the image forming unit conducts the image forming on a duplex paper on the basis of the image data for test in which the image processing is conducted.

In accordance with a third aspect of the invention, an management system of an image forming device, which is structured by the image forming device and a management device for managing the image forming device through a communication network;
the management device comprising a communication unit for sending a data of a computing parameter for conducting an image processing and a data of a set value indicating a computing procedure of the image processing, to the image forming device;
the image forming device comprising:
an image processing circuit for conducting the predetermined image processing for an image data;
an image forming unit for conducting an image forming on the basis of the image data in which the image processing is conducted; and
a read unit for reading an image formed by the image forming unit;
the image processing circuit comprising:
a plurality of computing modules for conducting the predetermined image processing;
a plurality of output storage circuits connected with each of output stages of the computing modules, the output storage circuits reading and storing an output data from each of the computing modules on a timing of a signal change of a clock signal;
a computing parameter memory circuit for memorizing the data of the computing parameter sent from the management device;
a computing procedure memory circuit for memorizing the data of the set value indicating the computing procedure sent from the management device; and
a selector connected with each of input stages of the computing modules, the selector selectively choosing a data among from a targeted image data of the image processing, the data indicating the computing parameter, and each of the output data of the output storage circuits, in accordance with the set value of the computing procedure stored in the computing procedure memory circuit, and outputting a chosen data to the computing module connected with rearward stages;

wherein in the image forming device, by the image processing circuit, the image processing is conducted for an image data for test on the basis of the data of the computing parameter sent from the management device and the data of the set value indicating the computing procedure, and by the image forming unit, the image forming is conducted on the basis of the image data in which the image processing is conducted, and by an image read unit, a formed image is read, and by comparing a read image and a predetermined expected image, a comparison result is sent to the management device.

Preferably, the image forming unit has a photo conductor, and the image formed by the image forming unit is a toner image formed on the photo conductor.

Preferably, the read unit reads the toner image on the photo conductor.

Preferably, the image forming unit conducts the image forming on a duplex paper on the basis of the image data in which the image processing is conducted.

According to the present invention, it is possible to determine (diagnose) the operating state of the image processing circuit in the image forming device from the management device through the communication network, and reduce the cost related to the operating test of the image processing circuit.

Further, the image processing circuit can conduct the image processing in an optional procedure by having the selector choosing the necessary data, in accordance with the set value indicating the computing procedure of the image processing which is set in the computing procedure memory circuit. Thereby, the image processing circuit can easily correspond to the specification change after the development of the image processing circuit and the versatility can be improved. Specifically, the convenience in the image forming device can be improved by allowing the computing procedure and the computing parameter of the image processing in the image processing circuit to be set from the management device through the communication network.

Further, the operating state of the image processing circuit after the function change can be determined (diagnosed) by allowing the function change and the operable frequency of the image processing circuit to be measured from the management device through the communication network. Thereby, the convenience in the image forming device can be additionally improved.

Further, an aged deterioration or the like can be amended by allowing the displacement of the image data to be corrected from the management device through the communication network. Thereby, the convenience in the image forming device can be additionally improved.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein;

FIG. 2 is a flowchart showing the operating test conducted in the image forming device of FIG. 1;

FIGS. 3A to 3E are block diagrams showing the circuit structure of the image processing circuit in which the function change can be conducted;

FIGS. 14A and 14B are enlarged views of the test pattern of FIG. 13;

DETAILED DESCRIPTION OF THE PREFERRED EMBODIMENTS

Hereinafter, the embodiments of the present invention will be described with reference to the drawings.

First of all, the structure will be described.

Figure 1:
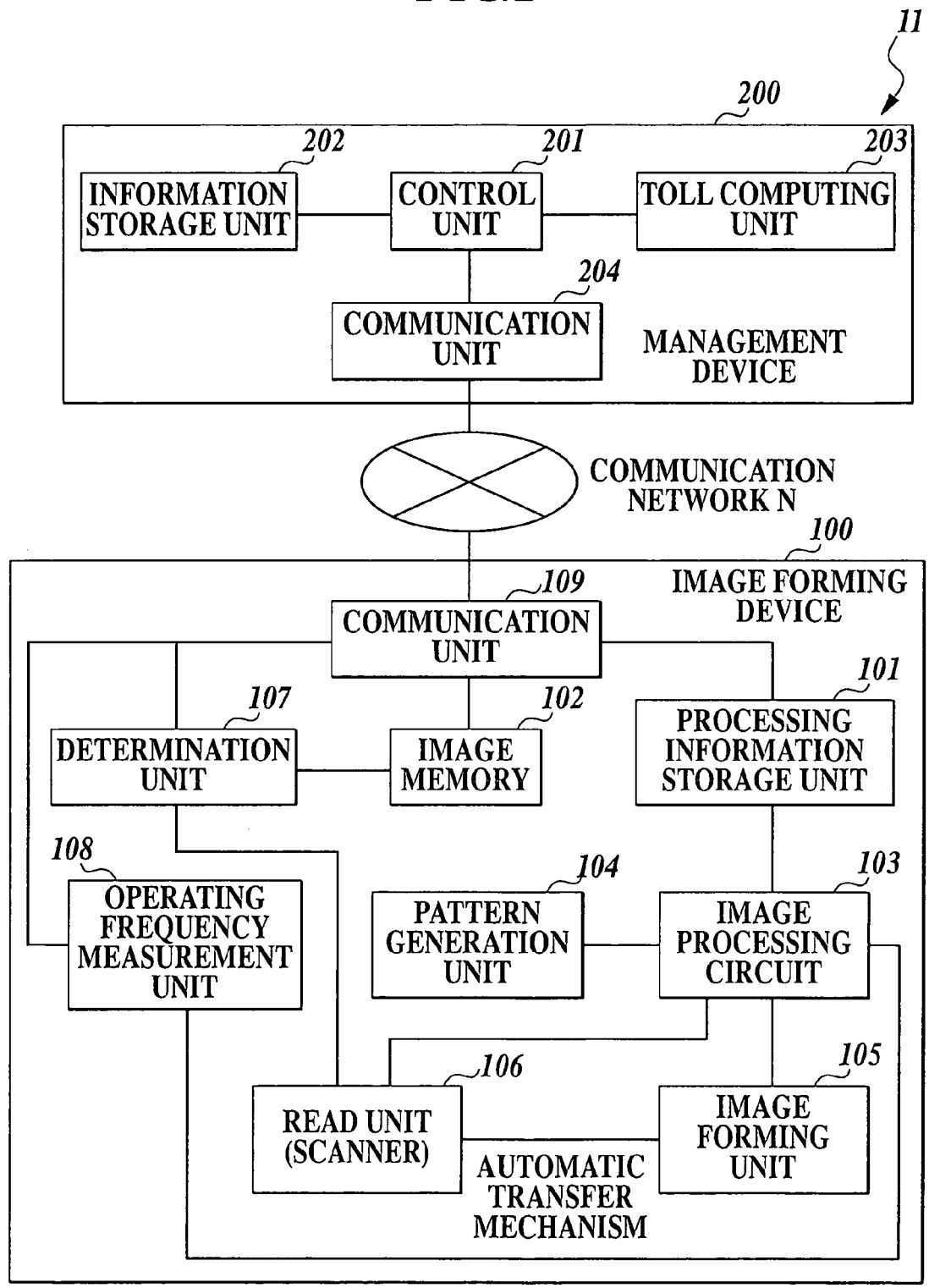
FIG. 1 is a block diagram showing the structure of the management system of the image forming device related to the present invention.
Figure 3B:
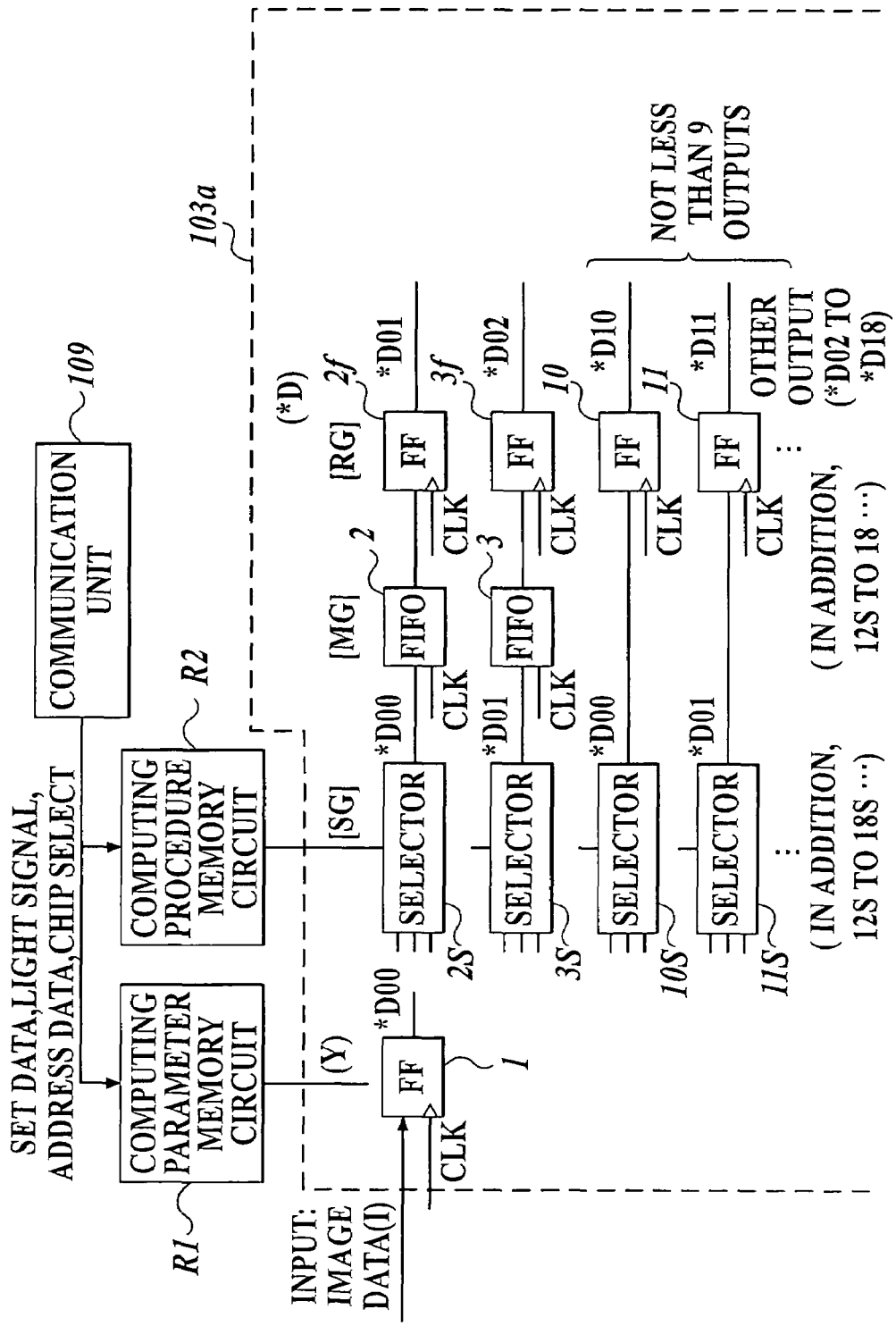

In FIG. 1, a management system 11 of an image forming device in the embodiment of the present invention is shown. Hereinafter, for simplicity, the management system 11 of the image forming device is just called a management system 11.

As shown in FIG. 1, the management system 11 has an image forming device 100 and a management device 200. The image forming device 100 and the management device 200 are connected through a communication network N. Additionally, although FIG. 1 shows the case that the management device 200 and the image forming device 100 are connected one-on-one, the number of the image forming device 100 connected with one management device 200 is not limited.

The image forming device 100 has a processing information storage unit unit 101, an image memory 102, an image processing circuit 103, a pattern generation unit 104, an image forming unit 105, a read unit 106, a determination unit 107, an operating frequency measurement unit 108 and a communication unit 109.

The processing information storage unit 101 stores all kinds of preset values necessary for the image processing, such as the image processing procedure commanded from the management device 200. The image memory 102 stores the expected image data sent from the management device 200. This expected image data is the standard image data so as to determine the operating state of the image processing circuit 103.

The image processing circuit 103 conducts the predetermined image processing for the image data for test (the image of test pattern) in accordance with the operating test command and the function change command from the management device 200. Further, the image processing circuit 103 conducts the predetermined image processing by the unshown operation portion. More detailed example of the function in the image processing circuit 103 will be described later with reference to FIGS. 3A to 3E, FIGS. 4A to 4C, FIG. 6 and FIGS. 11 to 13, FIGS. 14A and 14B, and FIG. 17.

When the operating test is commanded from the management device 200 through the communication unit 109, the pattern generation unit 104 outputs the image data of the predetermined test pattern to the image processing circuit 103. The image forming unit 105 has a photosensitive drum, a laser irradiation device and a polygon mirror, and prints out the image data processed in the image processing circuit 103, by the electrophotography method.

The read unit 106 has a scanner structured by a light source, CCD (Charged-Coupled Device) and A/D converter or the like. The read unit 106 irradiates the light from the light source to the copy (photo print, calligraphic works and paintings, and any kinds of print) disposed on the copy table. The reflected light is converted from the analogue signal to the digital signal by A/D converter. Thereby, the digital image signal is obtained. The image forming unit 105 and the read unit 106 are connected by an automatic transfer mechanism which can automatically carry a print sheet (transfer paper) printed out in the image forming unit 105 to the read unit 106 and dispose the print sheet on the copy table of the scanner. Further, the read unit 106 is structured to be capable of reading a toner image formed on the photosensitive drum of the image forming unit 105.

The determination unit 107 determines the operating state (good or bad of the operation) of the image processing circuit 103 by comparing the expected image data stored in the image memory 102 and the image data read by the read unit 106.

The operating frequency measurement unit 108 measures the operable frequency of the image processing circuit 103 by the command from the management device 200. The more details of the function in the operating frequency measurement unit 108 will be described later with reference to FIG. 7, FIGS. 8A to 8N, FIG. 9, and FIGS. 10A to 10J. The communication unit 109 conducts the control for communicating with the outer device (the management device 200) through the communication network N.

The management device 200 has a control unit 201, an information storage unit 202, a toll computing unit 203 and an communication unit 204.

The control unit 201 conducts the central control of the operation of each portion structuring the management device 200 in accordance with the control processing program stored in the memory (not shown). The information storage unit 202 stores the information related to various operating tests and the function change which are conducted by the image forming device 100.

The toll computing unit 203 computes the management expense imposed on the image forming device 100 on the basis of the information stored in the information storage unit 202. The communication unit 204 conducts the control for communicating with the outer device (the image forming device 100) through the communication network N.

Next, the operation of the image forming device 100 will be described.

With reference to the flow chart of FIG. 2, the operating test conducted in the image forming device 100 will be described.

When the signal indicating the start of the operating test, the data indicating the image processing procedure, and the expected image data are received from the management device 200 (step S1), the data indicating the image processing procedure is stored in the processing information storage unit 101, the expected image data is stored in the image memory 102. Further, for the image data of the test pattern, the image processing is conducted in accordance with the image processing procedure stored in the processing information storage unit 101 (step S2).

Further, the image data of the test pattern in which the image processing is conducted is printed out on the print sheet (step S3). The print sheet on which the image of the test pattern is printed is carried to the read unit 106 by the automatic transfer mechanism and disposed on the copy table of the scanner of the read unit 106. Further, the image on the print sheet disposed on the copy table is read by the scanner (step S4).

Further, the image data read by the scanner and the expected image data stored in the image memory 102 are compared, and the operating state (good or bad) of the image processing circuit 103 is determined (step S5). For example, in the step S5, the displacement of the image data read by the scanner is beyond the predetermined level, the image processing circuit 103 is determined abnormal. Further, the determination result of the step S5 and the signal indicating the finish of the operating test are sent to the management device 200 by the communication unit 109 (step S6), and this operating test is finished.

In the management device 200, when the finish signal is received from the image forming device 100, the information related to the operating test in the image forming device 100 is stored in the information storage unit 202. In the toll computing unit 203, the toll imposed on the image forming device 100 is computed on the basis of the operating test information in the image forming device 100. The operating test information is stored in the information storage unit 202. The computed toll is notified to the predetermined communication terminal.

As above, the operating state of the image processing circuit 103 can be diagnosed (determined) from the management device 200 through the communication network N. Thereby, the cost related to the operating test of the image processing circuit can be reduced. The function change of the image processing circuit Next, as an applicable example of the image processing circuit 103 in FIG. 1, the image processing circuit 103a in which a remote function change is conducted will be described.

First, the structure of the image processing circuit 103a is described. In FIGS. 3A to 3E, the circuit structure of the image processing circuit 103a is shown. The image processing circuit 103a is a circuit for conducting filter computing and gamma conversion to the image data. As shown in FIGS. 3A to 3E, the image processing circuit 103a has FF 1, a selector group SG, a computing module group MG, an output storage register group RG, a computing parameter memory circuit R1, and a computing procedure memory circuit R2. The processing information storage unit unit 101 of FIG. 1 has the computing parameter memory circuit R1 and the computing procedure memory circuit R2.

The selector group SG has a selector 2S, a selector 3S, 9 or more selectors 10S, 11S and so forth, 9 or more selector groups 20S, 21S and so forth, 4 or more selectors 30S, 31S, 32S, 40S, and so forth, a selector 50S, and a selector 60S. The computing module group MG has a FIFO 2, a FIFO 3, 9 or more multipliers 20m, 21m and so forth, 4 or more adders 30m, 31m, 32m, 40m and so forth, and LUT 50. The output storage register group RG has FF 2f, FF 3f, 9 or more FF 10, FF 11 and so forth, 9 or more FF 20f, FF 21f and so forth, 4 or more FF 30f, FF 31f, FF 32f, FF 40f and so forth, and FF 50f and FF 60.

The input stages of each selector structuring the selector group SG are connected with the output stages of the computing parameter memory circuit R1, the computing procedure memory circuit R2, FF 1 and each FF of the output storage register group RG.

The output stages of the selector 2S are connected with the input stages of FIFO 2. The output stages of the selector 3S are connected with the input stages of the FIFO 3. The output stages of selectors 10S, 11S and so forth are respectively connected with FF 10, FF 11 and so forth.

The selector 20S has the selector 20Sy and 20Sd. These output stages are connected with the input stair of the multiplier 20m. The selector 21S has the selector 21Sy and 21Sd. These output stages are connected with the input stages of the multiplier 21m. The selector 22S has the selectors 22Sy and 22Sd. These output stages are connected with the input stages of the multiplier 22m. The selector 23S has the selectors 23Sy and 23Sd. These output stages are connected with the input stages of the multiplier 23m.

The selector 24S has the selectors 24Sy and 24Sd. These output stages are connected with the input stages of the multiplier 24m. The selector 25S has the selectors 25Sy and 25Sd. These output stages are connected with the input stages of the multiplier 25m. The selector 26S has the selectors 26Sy and 26Sd. These output stages are connected with the input stages of the multiplier 26m. The selector 27S has the selectors 27Sy and 27Sd. These output stages are connected with the input stages of the multiplier 27m. The selector 28S has the selectors 28Sy and 28Sd. These output stages are connected with the input stages of the multiplier 28m.

The selector 30S has the selector 301S, 302S and 303S. These output stages are connected with the input stages of the adder 30a. The selector 31S has the selector 311S, 312S and 313S. These output stages are connected with the input stages of the adder 31a. The selector 32S has the selector 321S, 322S and 323S. These output stages are connected with the input stages of the adder 32a. The selector 40S has the selector 401S, 402S and 403S. These output stages are connected with the input stages of the adder 40a.

The output stages of the selector 50S are connected with the input stages of LUT 50. The output stages of the selector 60S are connected with the input stages of FF 60.

The output stages of FIFO 2 are connected with the input stages of FF 2f. The output stages of FIFO 3 are connected with the input stages of FF 3f. The output stages of the multipliers 20m, 21m and so forth are respectively connected with the input stages of FF 20f, FF 21f and so forth. The output stages of the adders 30a, 31a, 32a, 40a and so forth are respectively connected with the input stages of FF 30f, FF 31f, FF 32f, FF 40f and so forth. The output stages of LUT 50 are connected with the input stages of FF 50f.

Further, hereinafter, the output data of FF 1 is *D00, each output data from the output storage register group RG is (*D), and the output of the computing parameter memory circuit R1 is (Y).

In FIGS. 3A to 3E, the computing parameter memory circuit R1 stores the filter computing parameter (Y) input from the management device 200, and outputs it to each selector structuring the selector group SG. Each 103a shown in FIGS. 3B to 3E is illustrated by separating 103a shown in FIG. 3A. Further, (Y) indicating R1 output is a signal group (Y00, Y01, . . . ) and also an input of 103a.

The computing procedure memory circuit R2 stores the data indicating the computing procedure input from the management device 200, and outputs it to each selector of the selector group SG. This computing procedure data is a data which is set so as to choose from among the output *D00 of FF 1, the filter computing parameter (Y),and the output of the output storage register group RG (*D) by each selector of the selector group SG.

FF 1 has a plurality of (for example 8 or more) flip flops which is connected in parallel. In the clock input of each flip flop, each flip flop receives the reference clock signal (CLK) in common, and reads the image data (I) read by the light sensor such as CCD line sensor when this clock signal rises.

Each selector structuring the selector group SG selectively chooses the data among the image data *D00, (Y) and (*D) and outputs the chosen data to the computing module group MG of rearward stages and the output storage register group RG, in accordance with the computing procedure set data which is output from the computing procedure memory circuit R2.

Specifically, the selector 2S chooses the output *D00 of FF 1 and outputs it to FIFO 2. The selector 3S chooses the output *D01 of FF 2f and outputs it to FIFO 3. The selector 10S chooses the output *D00 of FF 2f and outputs it to FF 10. The selector 11S chooses the output *D10 of FF 10 and outputs it to FF 11. The selector 12S chooses the output *D11 of FF 11 and outputs it to FF 12. The selector 13S chooses the output *D01 of FF 2f and outputs it to FF 13. The selector 14S chooses the output *D13 of FF 13 and outputs it to FF 14. The selector 15S chooses the output *D14 of FF 14 and outputs it to FF 15. The selector 16S chooses the output *D02 of FF 3f and outputs it to FF 16. The selector 17S chooses the output *D16 of FF 16 and outputs it to FF 17. The selector 18S chooses the output *D17 of FF 17 and outputs it to FF 18.

The selector 20Sy chooses the parameter Y00 from the output (Y) of the computing parameter memory circuit R1 and outputs it to the multiplier 20m. The selector 20Sd chooses the output *D10 of FF 10 and outputs it to the multiplier 20m. The selector 21Sy chooses the parameter Y01 from the above output (Y) and outputs it to the multiplier 21m. The selector 21Sd chooses the output *D11 of FF 11 and outputs it to the multiplier 21m. The selector 22Sy chooses the parameter Y02 from the above output (Y) and outputs it to the multiplier 22m. The selector 22Sd chooses the output *D12 of FF 12 and outputs it to the multiplier 22m. The selector 23Sy chooses the parameter Y03 from the above output (Y) and outputs it to the multiplier 23m. The selector 23Sd chooses the output *D13 of FF 13 and outputs it to the multiplier 23m.

The selector 24Sy chooses the parameter Y04 from the output (Y) of the computing parameter memory circuit R1 and outputs it to the multiplier 24m. The selector 24Sd chooses the output *D14 of FF 14 and outputs it to the multiplier 24m. The selector 25Sy chooses the parameter Y05 from the above output (Y) and outputs it to the multiplier 25m. The selector 25Sd chooses the output *D15 of FF 15 and outputs it to the multiplier 25m. The selector 26Sy chooses the parameter Y06 from the above output (Y) and outputs it to the multiplier 26m. The selector 26Sd chooses the output *D16 of FF 16 and outputs it to the multiplier 26m. The selector 27Sy chooses the parameter Y07 from the above output (Y) and outputs it to the multiplier 27m. The selector 27Sd chooses the output *D17 of FF 17 and outputs it to the multiplier 27m. The selector 28Sy chooses the parameter Y08 from the above output (Y) and outputs it to the multiplier 27m. The selector 28Sd chooses the output *D18 of FF 18 and outputs it to the multiplier 28m.

The selectors 301S, 302S and 303S structuring the selector 30S respectively choose the output *D20 of FF 20f, the output *D21 of FF 21f and the output *D22 of FF 22f, and output them to the adder 30a. The selectors 311S, 312S and 313S structuring the selector 31S respectively choose the output *D23 of FF 23f, the output *D24 of FF 24f and the output *D25 of FF 25f, and output them to the adder 31a. The selectors 321S, 322S and 323S structuring the selector 32S respectively choose the output *D26 of FF 26f, the output *D27 of FF 27f and the output *D28 of FF 28f, and output them to the adder 32a. The selectors 401S, 402S and 403S structuring the selector 40S respectively choose the output *D30 of FF 30f, the output *D31 of FF 31f and the output *D32 of FF 32f, and output them to the adder 40a.

The selector 50S chooses the output *D40 of FF 40f and outputs it to LUT 50. The selector 60S chooses the output *D50 of FF 50f and outputs it to FF 60.

FIFO 2 of the computing module group MG reads the output data *D00 of the selector 2S and stores it. When the image data for one line is stored, FIFO 2 outputs the image data to FF 2f of rearward stages by each pixel of the stored order. FIFO 3 reads the output data *D01 of the selector 3S and stores it. When the image data for one line is stored, FIFO 2 outputs the image data to FF 2f of rearward stages by each pixel of the stored order.

The multiplier 20m multiplies the output data Y00 of the selector 20Sy by the output data *D10 of the selector 20Sd and outputs the multiplication result *D10·Y00 to FF 20f of rearward stages. The multiplier 21m multiplies the output data Y01 of the selector 21Sy by the output data *D11 of the selector 21Sd and outputs the multiplication result *D11·Y01 to FF 21f of rearward stages. The multiplier 22m multiplies the output data Y02 of the selector 22Sy by the output data *D12 of the selector 22Sd and outputs the multiplication result *D12·Y02 to FF 22f of rearward stages. The multiplier 23m multiplies the output data Y03 of the selector 23Sy by the output data *D13 of the selector 23Sd and outputs the multiplication result *D13·Y03 to FF 23f of rearward stages. The multiplier 24m multiplies the output data Y04 of the selector 24Sy by the output data *D14 of the selector 24Sd and outputs the multiplication result *D14·Y04 to FF 24f of rearward stages. The multiplier 25m multiplies the output data Y05 of the selector 25Sy by the output data *D15 of the selector 25Sd and outputs the multiplication result *D15·Y05 to FF 25f of rearward stages. The multiplier 26m multiplies the output data Y06 of the selector 26Sy by the output data *D16 of the selector 26Sd and outputs the multiplication result *D16·Y06 to FF 26f of rearward stages. The multiplier 27 multiplies the output data Y07 of the selector 27Sy by the output data *D17 of the selector 27Sd and outputs the multiplication result *D17·Y07 to FF 27f of rearward stages. The multiplier 28m multiplies the output data Y08 of the selector 28Sy by the output data *D18 of the selector 28Sd and outputs the multiplication result *D18·Y08 to FF 28f of rearward stages.

The adder 30a adds the output *D20 of the selector 301S, the output *D21 of the selector 302S and the output *D22 of the selector 303S and outputs the addition result *D20+*D21+*D22 to FF 30f of rearward stages. The adder 31a adds the output *D23 of the selector 311S, the output *D24 of the selector 312S and the output *D25 of the selector 313S and outputs the addition result *D23+*D24+*D25 to FF 31f of rearward stages. The adder 32a adds the output *D26 of the selector 321S, the output *D27 of the selector 322S and the output *D28 of the selector 323S and outputs the addition result *D26+*D27+*D28 to FF 32f of rearward stages. The adder 40a adds the output *D30 of the selector 401S, the output *D31 of the selector 402S and the output *D32 of the selector 403S and outputs the addition result *D30+*D31+ *D32 to FF 40f of rearward stages.

LUT 50 has an input-output correspondence table (lookup table) for gamma conversion written on RAM (Random Access Memory), uses this lookup table so as to conduct gamma conversion for the image data *D40 output from the selector 50S which is output from the selector 50S, and outputs it to FF 50f of rearward stages. This lookup table stores the content commanded from the management device 200.

Each FF structuring the output storage register group RG, as well as FF 1, is respectively structured by a plurality of flip flops which is connected in parallel. Each flip flop receives the reference clock signal (CLK) in common, and reads the output data from the computing module group MG and the selector group SG of forward stages when this clock signal rises.

Specifically, FF 2f reads the output data of FIFO 2. FF 3f reads the output data of FIFO 3. FF 10 to FF 18 respectively read the outputs *D10, *D11, *D12, *D13, *D14, *D15, *D16, *D17 and *D18 of the selectors 10S to 18S. FF 20f to FF 28 respectively read the outputs *D20, *D21, *D22, *D23, *D24, *D25, *D26, *D27 and *D28 of the multipliers 20m to 28m. FF 30f, FF 31f, FF 32f and FF 40f respectively read the outputs *D30, *D31, *D32 and *D 40 of the adders 30a, 31a, 32a and 40a. FF 50f reads the output data of LUT 50. FF 60 read the output data from the selector 60S.

Next, the operation of the image processing circuit 103a and the management device 200.

Figure 4A:
FIGS. 4A, 4B and 4C are timing charts when various data is set before the image processing.
Figure 4B:
Figure 4C:
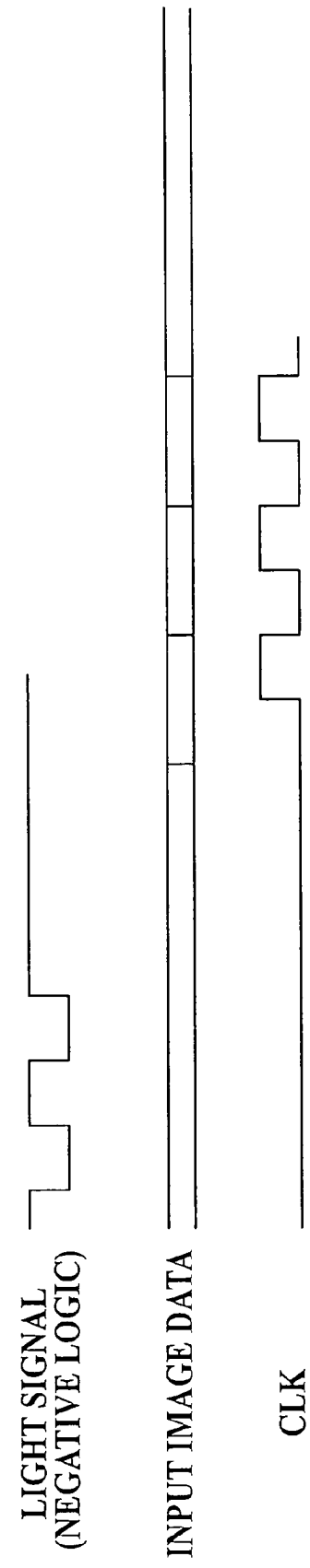

First of all, before the image processing in the image processing circuit 103a, the processing for setting the set data for gamma conversion, the filter computing parameter, and the computing procedure data by the management device 200 will be described with reference to FIGS. 4A to 4C.

When the data for gamma conversion is set in LUT 50 of the image processing circuit 103a, the set data (FIG. 4A) for gamma conversion, the address data (FIG. 4B) for commanding the place (address) in which the gamma conversion data is stored, the light signal (FIG. 4C) for designating the writing of the gamma conversion data, and the chip select signal for commanding the validity of the light signal for only LUT 50 are input from the management device 200 through the communication network N to the image processing circuit 103a. The gamma conversion data is input to LUT 50 in accordance with the light signal, and written in the place commanded by the address data in RAM in accordance with the light signal, and the lookup table indicating the set value of gamma conversion is created.

When the filter computing parameter (Y) (Y00, Y01, ... ) is set in the computing parameter memory circuit R1, the data (FIG. 4A) indicating the filter computing parameter (Y) to be the set data, the address data (FIG. 4B) for commanding the place (address) in which the filter computing parameter (Y) is stored, the light signal (FIG. 4C) for designating the writing of the parameter (Y), and the chip select signal for commanding the validity of the light signal for only the computing parameter memory circuit R1 are input from the management device 200 to the image processing circuit 103a. The filter computing parameter (Y) is input to the computing parameter memory circuit R1 in accordance with this chip select signal, and written in the place commanded by the address data in the computing parameter memory circuit R1.

When the computing procedure data is set in the computing procedure memory circuit R2, the set data (FIG. 4A) indicating the computing procedure, the address data (FIG. 4B) for commanding the place (address) in which the computing procedure data is stored, the light signal (FIG. 4C) for designating the writing of the computing procedure data, and the chip select signal for commanding the validity of the light signal for only the computing procedure memory circuit R2 are input from the management device 200 to the image processing circuit 103a. The computing procedure data is input to the computing procedure memory circuit R2 with regard to this chip select signal, and written in the place commanded by the address data in the computing procedure memory circuit R2 with regard to the light signal.

When the set operation of the computing procedure and the computing parameter is finished, the finish signal for notifying the finish of the set data is output from the communication unit 109. In the management device 200, when the finish signal is received from the image forming device 100, the information related to the function change in the image forming device 100 is stored in the information storage unit 202. In the toll computing unit 203, the toll imposed on the image forming device 100 is computed on the basis of the function change information of the image forming device 100. The function change information is stored in the information storage unit 202. The computed toll is notified to the predetermined communication terminal. Although, in the above, when the set operation of the computing procedure and the computing parameter is finished, the finish signal is sent to the management device 200, the finish signal may be sent after the image processing is actually conducted in accordance with the computing procedure and the computing parameter which are newly set.

Next, the image processing (filter computing and gamma conversion) conducted in the image processing circuit 103a after the set data, filter computing parameter and the computing procedure data are set is described with reference to FIG. 5 and FIG. 6.

Figure 5:
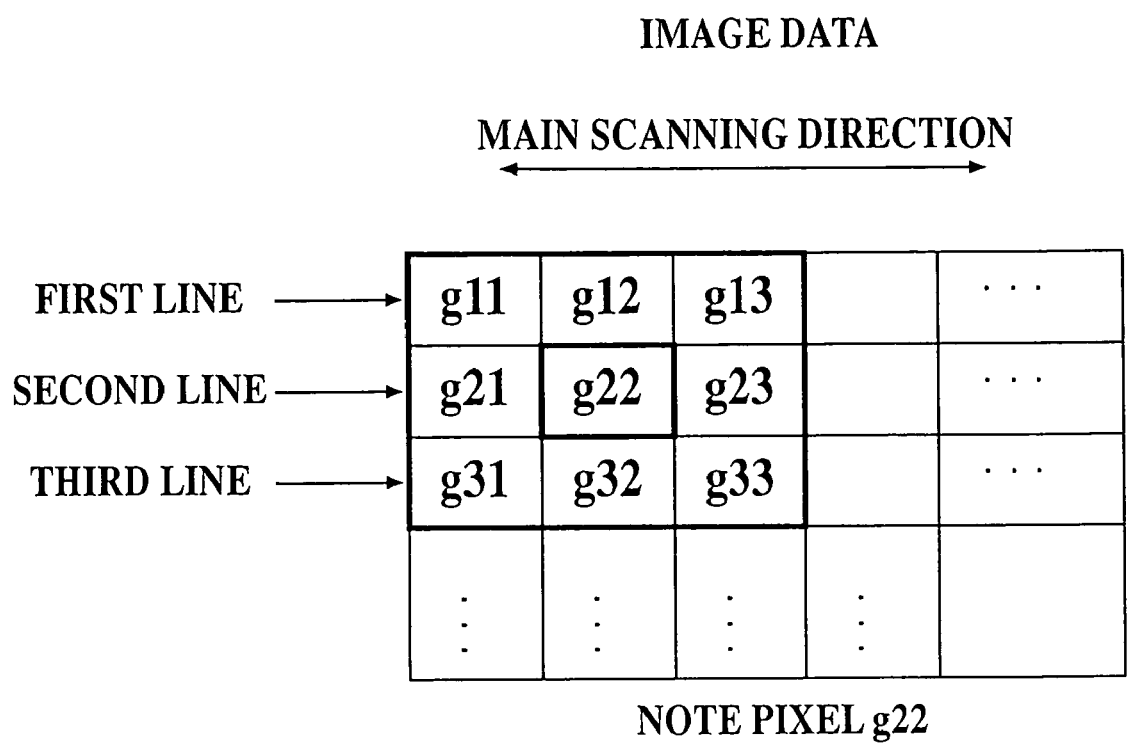
FIG. 5 is a view showing the image data of 9 pixels.

Further, FIG. 5 shows the image data read by the light sensor such as CCD line sensor. g11, g12, and g13 are image data comprised in the first line. G21, g22, and g23 are image data comprised in the second line. G31, g32, and g33 are image data comprised in the third line. Each g11 to g33 shows an image data of one pixel. All of g11 to g33 show the image data of 9 pixels.

Hereinafter, the note pixel is g22, and by seeing the image data g11 to g33 of 9 pixels (3 pixels of sub scanning direction ×3 pixels of the main scanning direction) including the pixel adjacent to g22, the operation will be described when the image processing (filter computing and gamma conversion of 3×3) with respect to the note pixel g22 is conducted.

If the input of the image data of the third line is started after the image data of the first line and second line, and g33 is input after the image data of the g31 and g32, this image data g33 is first read in FF 1. The g33 output from FF 1 is chosen by the selector 2S and 10S, and respectively read in FIFO 2 and FF 10 of rearward stages.

Even as g33 is read in FF 10, g32 which is one pixel from g33 is read in FF 11, and g31 which is two pixel from g33 is read in FF 12, and further, even as g23, g22 and g21 of the second line are respectively read in FF 13, FF 14 and FF 15, and g13, g12 and g11 of the first line are respectively read in FF 16, FF 17 and FF 18.

The g33 output from FF 10 is chosen by the selector 20Sd in accordance with the set data stored in the computing procedure memory circuit R2, and input to the multiplier 20m. At this time, the filter computing parameter Y00 is chosen in the selector 20Sy and Y00 is input to the multiplier 20m.

At this time, the g32 output from FF 11 is chosen by the selector 21Sd in accordance with the set data stored in the computing procedure memory circuit R2, and input to the multiplier 21m. At this time, the filter computing parameter Y01 is chosen in the selector 21Sy and Y01 is input to the multiplier 21m.

Further, the g31 output from FF 12 is chosen by the selector 22Sd in accordance with the set data stored in the computing procedure memory circuit R2, and input to the multiplier 22m. At this time, the filter computing parameter Y02 is chosen in the selector 22Sy and Y02 is input to the multiplier 22m.

Further, the g23 output from FF 13 is chosen by the selector 23Sd in accordance with the set data stored in the computing procedure memory circuit R2, and input to the multiplier 23m. At this time, the filter computing parameter Y03 is chosen in the selector 23Sy and Y03 is input to the multiplier 23m.

Further, the g22 output from FF 14 is chosen by the selector 24Sd in accordance with the set data stored in the computing procedure memory circuit R2, and input to the multiplier 24m. At this time, the filter computing parameter Y04 is chosen in the selector 24Sy and Y04 is input to the multiplier 24m.

Further, the g21 output from FF 15 is chosen by the selector 25Sd in accordance with the set data stored in the computing procedure memory circuit R2, and input to the multiplier 25m. At this time, the filter computing parameter Y05 is chosen in the selector 25Sy and Y05 is input to the multiplier 25m.

Further, the g13 output from FF 16 is chosen by the selector 26Sd in accordance with the set data stored in the computing procedure memory circuit R2, and input to the multiplier 26m. At this time, the filter computing parameter Y06 is chosen in the selector 26Sy and Y06 is input to the multiplier 26m.

Further, the g12 output from FF 17 is chosen by the selector 27Sd in accordance with the set data stored in the computing procedure memory circuit R2, and input to the multiplier 27m. At this time, the filter computing parameter Y07 is chosen in the selector 27Sy and Y07 is input to the multiplier 27m.

Next, in the multiplier 20m, the filter computing parameter Y00 output from the selector 20Sy is multiplied to the g33 output from the selector 20Sd, and the computing result g33·Y00 is read in FF 20f of rearward stages.

At this time, in the multiplier 21m, the filter computing parameter Y01 output from the selector 21Sy is multiplied to the g32 output from the selector 21Sd, and the computing result g32·Y01 is read in FF 21f of rearward stages.

Further, at this time, in the multiplier 22m, the filter computing parameter Y02 output from the selector 22Sy is multiplied to the g31 output from the selector 22Sd, and the computing result g31·Y02 is read in FF 22f of rearward stages.

Further, at this time, in the multiplier 23m, the filter computing parameter Y03 output from the selector 23Sy is multiplied to the g23 output from the selector 23Sd, and the computing result g23·Y03 is read in FF 23f of rearward stages.

Further, at this time, in the multiplier 24m, the filter computing parameter Y04 output from the selector 24Sy is multiplied to the g22 output from the selector 24Sd, and the computing result g22·Y04 is read in FF 24f of rearward stages.

Further, at this time, in the multiplier 25m, the filter computing parameter Y05 output from the selector 25Sy is multiplied to the g21 output from the selector 24Sd, and the computing result g21·Y05 is read in FF 25f of rearward stages.

Further, at this time, in the multiplier 26m, the filter computing parameter Y06 output from the selector 26Sy is multiplied to the g13 output from the selector 26Sd, and the computing result g13·Y06 is read in FF 26f of rearward stages.

Further, at this time, in the multiplier 27m, the filter computing parameter Y07 output from the selector 27Sy is multiplied to the g12 output from the selector 27S, and the computing result g12·Y07 is read in FF 27f of rearward stages.

Further, at this time, in the multiplier 28m, the filter computing parameter Y08 output from the selector 28Sy is multiplied to the g11 output from the selector 28S, and the computing result g11·Y08 is read in FF 28f of rearward stages.

Next, the output g33·Y00 of FF 20f is chosen by the selector 301S, and output to the adder 30a of rearward stages. At this time, the output g32·Y01 of FF 21f is chosen by the selector 302S, and output to the adder 30a of rearward stages. Further, at this time, the output g31·Y02 of FF 22f is chosen by the selector 303S, and output to the adder 30a of rearward stages.

Further, at this time, the output g23·Y03 of FF 23f is chosen by the selector 311S, and output to the adder 31a of rearward stages. Further, at this time, the output g22·Y04 of FF 24f is chosen by the selector 312S, and output to the adder 31a of rearward stages. Further, at this time, the output g21·Y05 of FF 25f is chosen by the selector 313s, and output to the adder 31a of rearward stages.

Further, at this time, the output g13·Y06 of FF 26f is chosen by the selector 321S, and output to the adder 32a of rearward stages. Further, at this time, the output g12·Y07 of FF 27f is chosen by the selector 322S, and output to the adder 32a of rearward stages. Further, at this time, the output g11·Y08 of FF 28f is chosen by the selector 323S, and output to the adder 32a of rearward stages.

In the adder 30a, the output g33·Y00 of the selector 301S, the output g32·Y01 of the selector 302S and the output g31·Y02 of the selector 303S are added. The addition result (g33·Y00+g32·Y01+g31·Y02) is output to FF 30f of rearward stages.

At this time, in the adder 31a, the output g23·Y03 of the selector 311S, the output g22·Y04 of the selector 312S and the output 421·Y05 of the selector 313S are added. The addition result (g23·Y03+g22·Y04+g21·Y05) is output to FF 31f of rearward stages.

Further, at this time, in the adder 32a, the output g13·Y06 of the selector 321S, the output g12·Y07 of the selector 322S and the output g11·Y08 of the selector 323S are added. The addition result (g13·Y06+g12·Y07+g11·Y08) is output to FF 32f of rearward stages.

The output (g33·Y00+g32·Y01+g31·Y02) of FF 30f is chosen by the selector 401S, and output to the adder 40a of rearward stages. At this time, the output (g23·Y03+g22·Y04+g21·Y05) of FF 31f is chosen by the selector 402S, and output to the adder 40a of rearward stages. Further, at this time, the output (g13·Y06+g12·Y07+g11·Y08) of FF 32f is chosen by the selector 403S, and output to the adder 40a of rearward stages.

In the adder 40a, the output (g33·Y00+g32·Y01+g31·Y02) of the selector 401S, the output (g23·Y03+g22·Y04+g21·Y05) of the selector 402S, and the output (g13·Y06+g12·Y07+g11·Y08) of the selector 403S are added, and output to FF 40f of rearward stages.

The output data (g33·Y00+g32·Y01+g31·Y02+g23·Y03+g22·Y04+g21·Y05+g13·Y06+g12·Y07+g11·Y08) of FF 40f is output to LUT 50. In LUT 50, gamma conversion is conducted for this image data. The image data in which gamma conversion is conducted is read in FF 50*f* of rearward stages.

The output *D50 of FF 50*f* is chosen by the selector 60S, and read in FF 60 of rearward stages. The image data (O) output from FF 60 is the image data in which the filter computing and gamma conversion are conducted for the note pixel g22.

Figure 6:
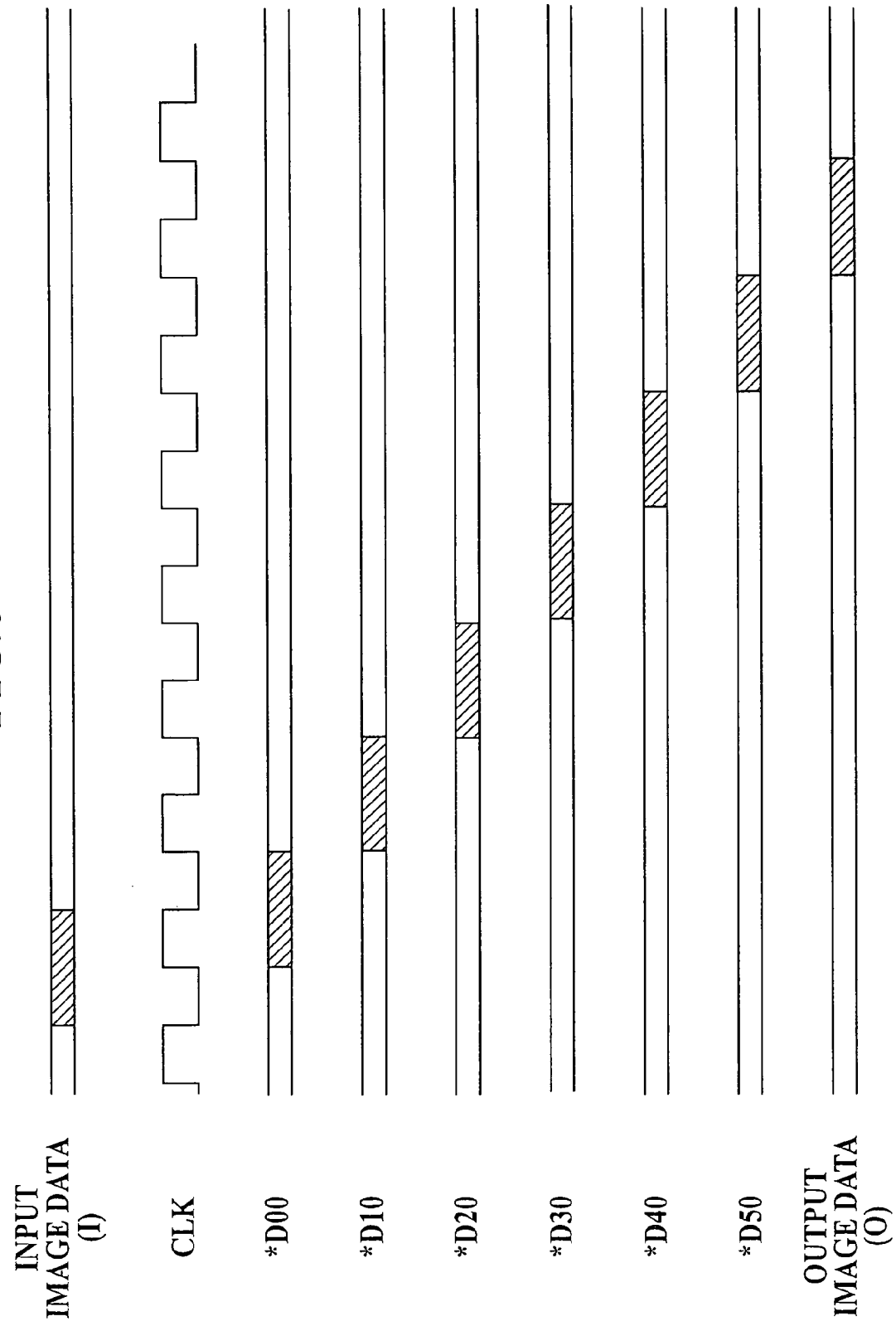
FIG. 6 is a timing chart showing the output from each FF of the image processing circuit of FIGS. 3A to 3E.

FIG. 6 is a time chart showing the output (the output *D00 of FF 1, the output *D10 of FF 10, the output *D20 of FF 20*f*, the output *D30 of FF 30*f*, the output *D40 of FF 40*f*, the output *D50 of FF 50, and the output (O) of FF 60) of each FF after the image data (I) (the shaded area of drawing) of one pixel is input in the image processing circuit 103*a*.

The image data (I) is read by the rising of the clock signal in each FF, and sequentially transferred to FF of rearward stages. According to the timing chart shown in FIG. 6, it is obvious that 6 clocks (6 periods of the clock signal) is necessary from the reading of the image data (I) by FF 1 till the output of FF 60. In other words, 6 clocks are necessary for the image processing of one pixel.

In the example of image data shown in FIG. 5, after the image data g33 of the third line is input, 6 clocks are necessary to conduct the image processing (filter computing, gamma conversion) for the note pixel g22 positioning the center of the image data of 9 pixels. Further, when the multiply circuit for multiplying the frequency of the reference clock signal is inserted to the image processing circuit 103*a* and this multiply circuit is connected with the clock input of each FF in the image processing circuit 103*a*, the image processing time is shortened. For example, if the frequency of the reference clock signal is doubled, the time that is necessary from the reading of the image data (I) by FF 1 till the output of FF 60 is shortened to 3 clocks.

As above, according to the image processing circuit 103*a*, by arranging the computing unit such as the multiplier and the adder, the memory circuit such as FIFO and LUT in parallel, disposing the selector in the forward stages of these circuits, and allowing each selector to choose the proper data in accordance with the computing procedure set data which is set by the management device 200, the image processing of the optional procedure is possible, which can easily cope with the specification change after the development, and the versatile image processing circuit of the soft processing level is realized.

Specifically, if the number and the kind of the computing units is increased as many as possible, the versatility of the image processing circuit 103*a* is enhanced. For example, in the image processing circuit 103*a* of FIGS. 3A to 3E, if FIFO that is not less than 4, the multiplier that is not less than 16, and the adder that is not less than 4 (3+1) is mounted, the filter computing of 4×4 can be conducted. Further, if the computing unit of the wide bit width is mounted, the versatility of the image processing circuit can be additionally enhanced. Further, the multiply circuit for multiplying the frequency of the clock signal is inserted to the image processing circuit 103*a*, the image processing can be speeded up.

Operating Frequency Measurement Test

Next, an operating frequency measurement unit 108 capable of testing for measuring the frequency in which the image processing circuit 103 operates will be described.

First of all, the structure of the operating frequency measurement unit 108 will be described.

Figure 7:
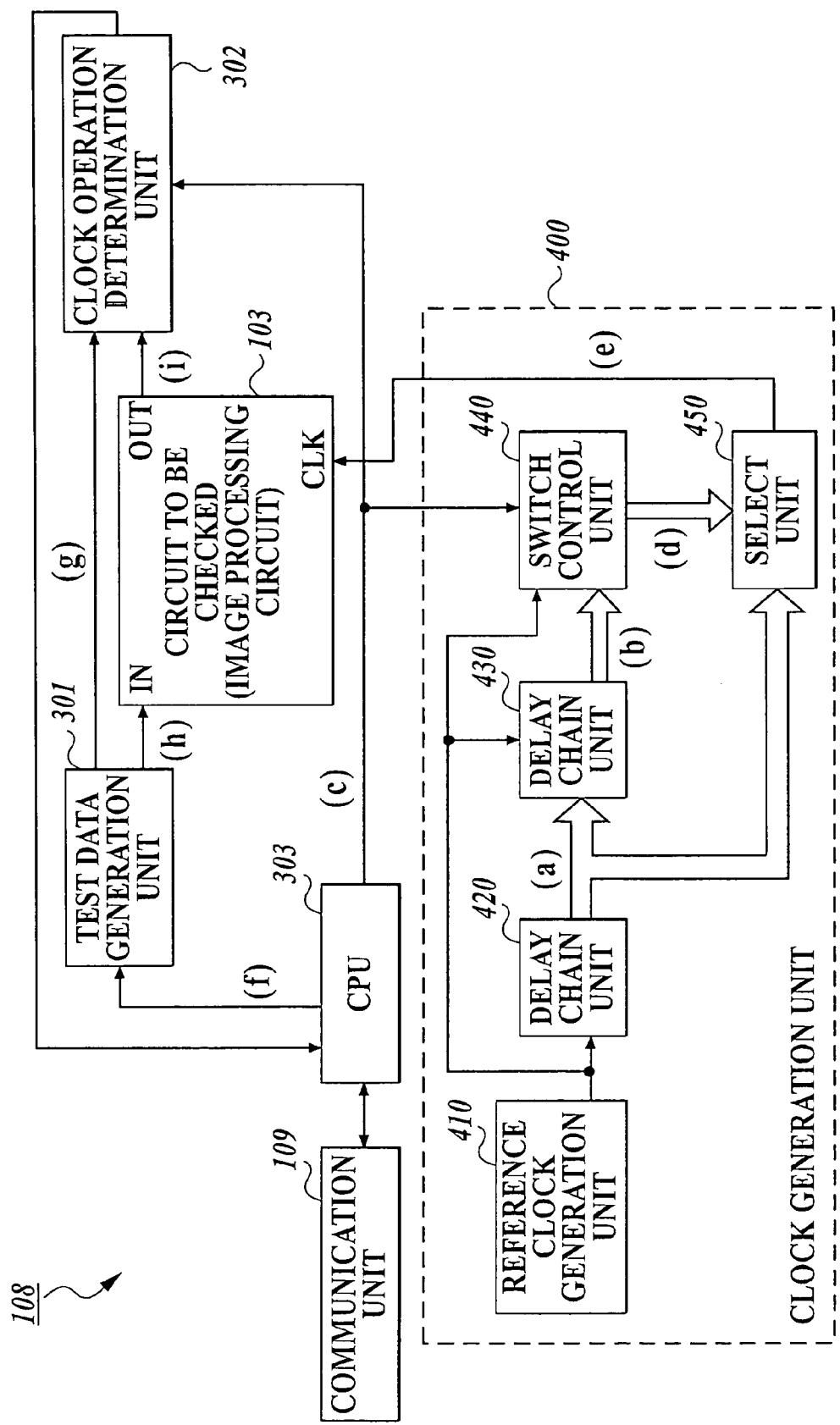
FIG. 7 is a block diagram showing the circuit structure of the operating frequency measurement unit of FIG. 1.

In FIG. 7, a block diagram showing the circuit structure of the operating frequency measurement unit 108 is shown. The operating frequency measurement unit 108 has a circuit to be checked 103, a test data generation unit 301, a clock operation determination unit 302, CPU 303, and a clock generation unit 400.

The circuit to be checked 103 is the circuit to be checked in which the operable frequency is measured. In the embodiment, the image processing circuit of FIG. 1 is applied and has a same code. Hereinafter, the circuit to be checked is called the image processing circuit 103.

The test data generation unit 301 generates an input test data ((h) in FIG. 7) supplied to the image processing circuit. Further, the test data generation unit 301 outputs (generates) an expected value test data which is input from the management device 200 through the communication network N. The expected value test data denotes the data expected in the normal time when the input test data is supplied to the image processing circuit 103. Further, in FIG. 7, although the test data generation unit 301 generates both of the input test data and the expected value test data, a separate circuit may generate each test data.

The clock operation determination unit 302 determines whether the image processing circuit 103 normally operates or not by comparing an output test data ((i) in FIG. 7) and the expected test data ((g) in FIG. 7). The output test data ((i) in FIG. 7) is output by the image processing circuit 100 after the image processing circuit 100 receives the input test data.

CPU 303 conducts the central control of the operation of each unit of the operating frequency measurement unit 108. This CPU 303 sets the frequency of the clock signal supplied to the image processing circuit 108.

The clock generation unit 400 has a reference clock generation unit 410, a delay chain unit 420, a delay detection unit 430, a switch control unit 440, and a select unit 450.

The reference clock generation unit 410 generates the clock signal (reference clock signal) to be referred. The delay chain unit 420 delays the reference clock signal which is input from the reference clock generation unit 410, and generates a plurality of the delayed clock signal (plurality of clock signal: (a) in FIG. 7) in which the phase is slightly different.

Here, in the delay chain unit 420, it is preferable that a plurality of delay chips is connected as sort of chain in a multistage connection so as to meet the number of stages in which the delayed clock in which the phase is slightly different can be generated over the two periods of the reference clock signal. Further, here, although the delayed clock signal is generated by using the delay chip, the clock generation unit for generating a plurality of the clocks in which the phase is different, without using the delay chip.

The delay detection unit 430 detects the number of stages (synchronous point) of the delayed clock signal synchronizing with the reference clock signal from the each delayed clock signal ((a) in FIG. 7) which is input from the delay chain unit 420, and outputs the detected number of stages as a delay information of the clock signal. This delay information can be called the phase contrast state. This delay information (phase contrast state) comprises the after-mentioned synchronous point information and the phase contrast self state (phase contrast state).

Here, in the delay detection unit 430, the reference clock signal which is output from the reference clock generation unit 410 and a plurality of the delayed clock signals which is output from the delay chain unit 420 are input. A first synchronous point information V1st which is the most synchronous with the reference clock signal, a second synchronous point information V2nd which is the second most synchronous with the reference clock signal, and a delayed stages number Vprd between them are output from among a plurality of the delayed clock signals.

Figure 8A:
FIGS. 8A to 8N are timing charts showing the delayed clock signal which is output from the delay chain unit of FIG. 7.
Figure 8B:
Figure 8C:
Figure 8D:
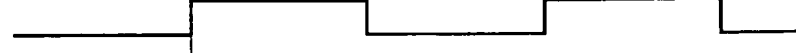
Figure 8E:
Figure 8F:
Figure 8G:
Figure 8H:
Figure 8I:
Figure 8J:
Figure 8K:
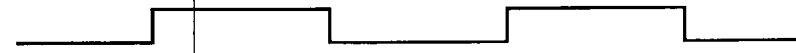
Figure 8L:
Figure 8M:
Figure 8N:

In FIGS. 8A to 8N, the reference clock signal (FIG. 8A), and DL19 to DL 51 (FIGS. 8B to 8N) from among each delayed clock signal (DL1, DL2, . . . ) which is output from the delay chain unit 420 are shown. In the delayed clock signal shown in FIGS. 8A to 8N, because the first synchronous point information V1st=20 corresponds to the second synchronous point information V2nd=50, the delayed stages number Vprd is 50−20=30.

As above, to detect the number of stages of the delayed clock signal which is synchronous with the reference clock signal, the flip flop having the input which is the outputs adjacent to each other in the delay chain 420 is disposed, and the point that the logic of the adjacent input reverses is detected. In other words, the input stages of the flip flop is connected with each output stages of the delay chain unit 420, the circuit for detecting not less than one point in which the logic of the adjacent outputs are different each other from among the outputs of the delayed clock signal from the delay chain unit 420 is disposed, the same clock signal or the same optional signal is input to all of the flip flops, the value (delayed stages number) of the point in which the logics are different is used as the delayed information.

The switch control unit 440 outputs a select stages information ((d) in FIG. 7) indicating which clock signal of the phase to be chosen so as to generate the clock pulse of the frequency set by CPU 303, from among each delayed clock signals which is output from the delay chain unit 420, on the basis of the frequency data ((c) in FIG. 7) which is set by CPU 303, the reference clock signal which is input from the reference clock generation unit 410, and the synchronous point information ((d) in FIG. 7) which is input from the delay detection unit 430.

In accordance with the select stages information ((d) in FIG. 7) which is input from the switch control unit 440, the select unit 450 chooses the clock signal from among each delayed clock signals which is output from the delay chain unit 420, and generates the clock pulse ((e) in FIG. 7) of the frequency set by the CPU 303.

Figure 9:
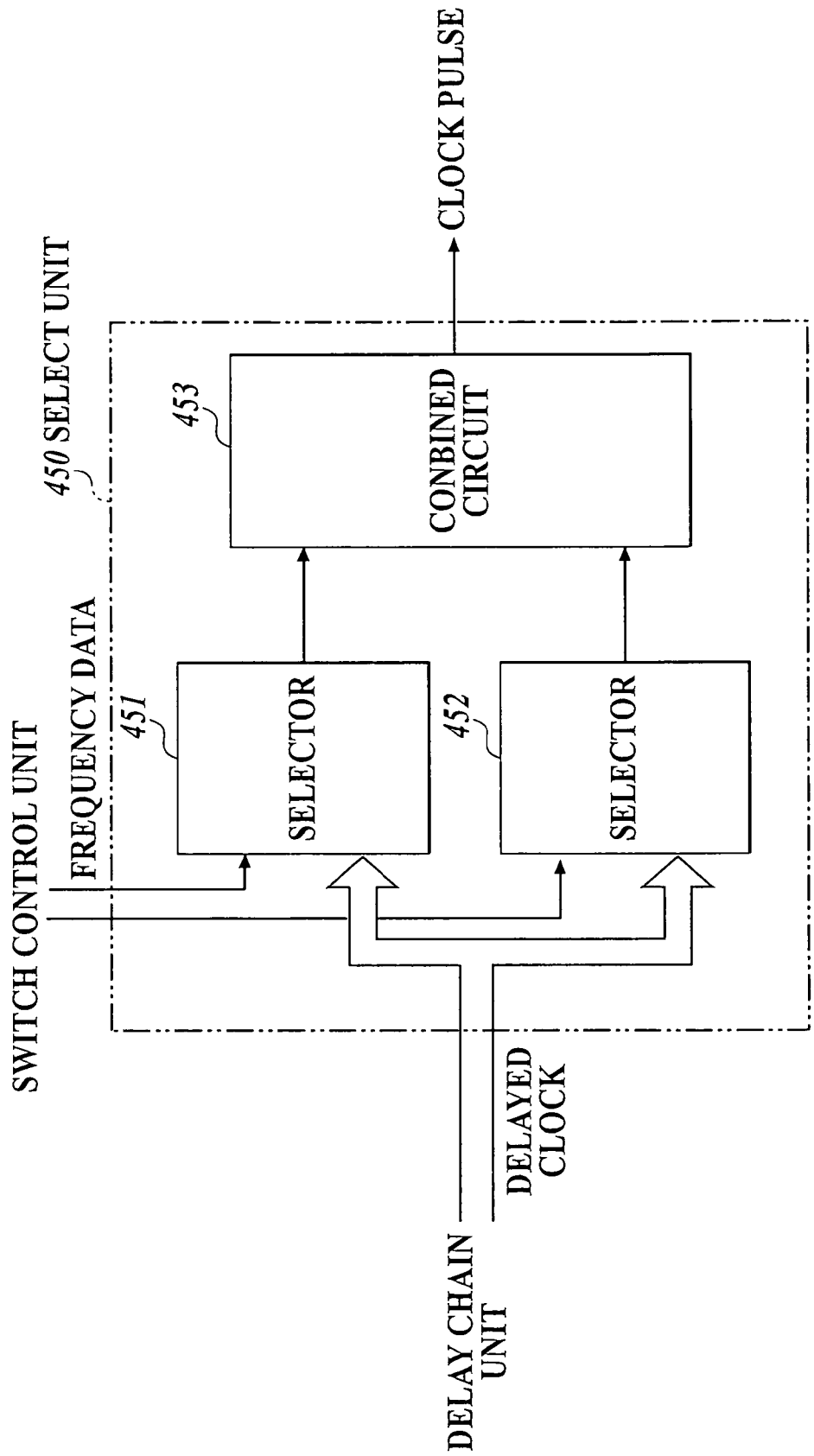
FIG. 9 is a block diagram showing the structure of the select unit of FIG. 7.

In FIG. 9, the structure of the select unit 450 is shown. As shown in FIG. 9, the select unit 450 has selectors 341 and 452, and a combined circuit 453. The selector 451 chooses the clock signal of the timing of rising commanded by the select stages number information, from among each delayed clock signals which are output from the delay chain unit 420. The selector 452 chooses the clock signal of the timing of falling commanded by the select stages number information, from among each delayed clock signals which are output from the delay chain unit 420. The combined circuit 453 has a logic circuit (AND, OR, NAND, NOR, ExOR, ExNOR and so on) and generates the clock pulse ((e) in FIG. 7) of the frequency set by CPU 303 from among the clock signals chosen from the selector 451 and 452.

Because the clock generation unit 400 receives the designation from CPU 303 and digitally determines (chooses) the rising and falling of the clock pulse to be output, the frequency and the timing can be changed at once. Further, even if the delay time fluctuates by the chips structuring the delay chain unit 420, because the fluctuation is detected in the delay detection unit 430, the clock pulse which is finally generated is not affected and the stable timing and the clock pulse of the frequency can be obtained. In other words, without the problem that the setup time for such as changing the frequency by the PLL circuit according to an earlier development is necessary and so forth, the preferred clock pulse can be obtained at once by computing in real time.

Further, in the clock generation unit 400, because the rising and falling of the clock pulse supplied to the image processing circuit 103 are determined by using a plurality of the delayed clock signal, the frequency of the clock pulse supplied to the image processing circuit 103 is not limited to the integer multiplication of the frequency of the reference clock signal, which is different from the multiplying and the dividing of the general digital circuit. Therefore, the clock pulse having the optional frequency can be generated.

Next, the operation of the operating frequency measurement unit 108 will be described. FIGS. 10A to 10J are a time chart showing the operation of the operating frequency measurement unit 108. The frequency of the reference clock signal which is output from the reference clock generation unit 410 is 100 MHz (FIG. 10A). Further, various parameters necessary for operating the image processing circuit 103 is previously set before the test.

When the expected test data and the start signal for designating the test start of the operating frequency are input from the management device 200, the operating frequency measurement is started on the timing that the start signal is H level (FIG. 10B). In FIGS. 10A to 10J, the test of the operating frequency is conducted in order of frequency 50 MHz, 100 MHz, and 150 MHz.

Figure 10:
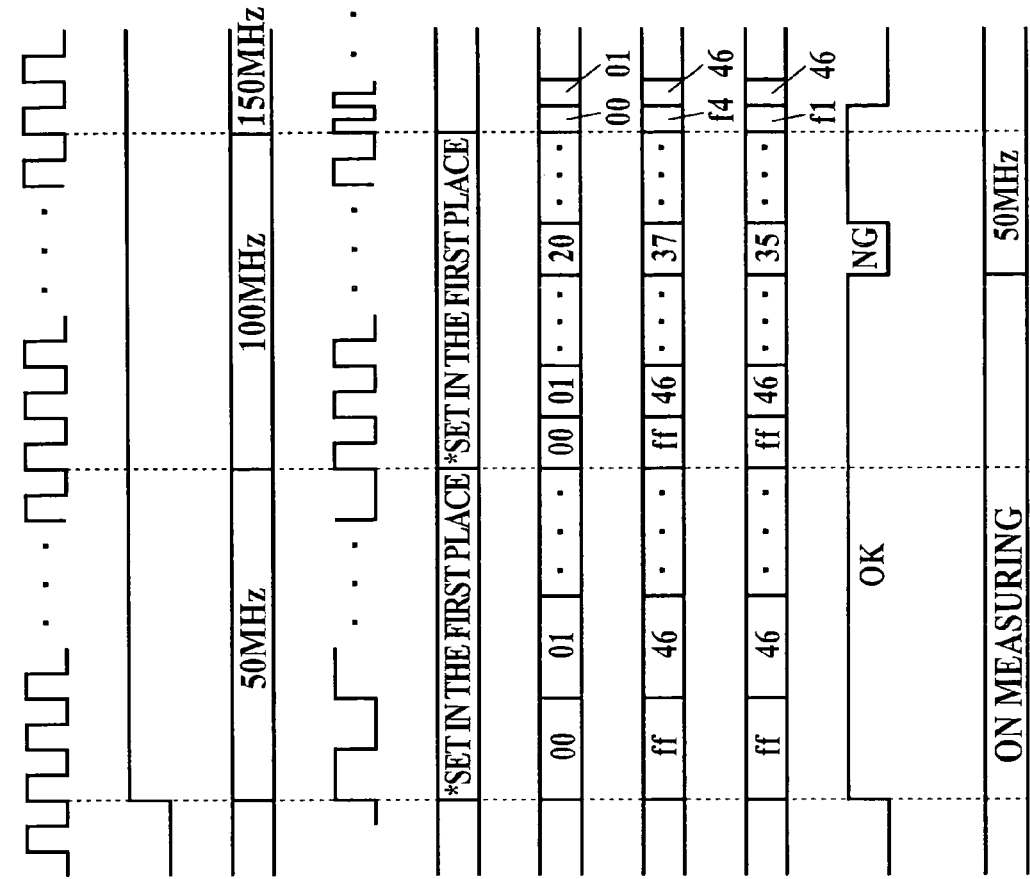
FIGS. 10A to 10J are timing charts showing the operation of the operating frequency measurement unit shown in FIG. 7.

First of all, in the first test period, when the input test data ((h) in FIG. 7) is supplied to the input terminal of the image processing circuit 103 in which the clock pulse of 50 MHz in which the reference clock signal is divided twice, the output test data ((i) in FIG. 7) is output from the output terminal of the image processing circuit 103. Next, in the clock operation determination unit 302, the clock operation determination unit 302 compares this output test data and the expected test data ((g) in FIG. 7) generated by the test data generation unit 301. In FIG. 10, because the output test data ((h) in FIG. 7) and the expected test data (FIG. 10G) in the clock pulse 50 MHz correspond, the determination in the clock operation determination unit 302 is "OK" (normal operation) (FIG. 10I).

In the second test period, when the input test data is supplied to the input terminal of the image processing circuit 103 in which the clock pulse 100 MHz is supplied, the output test data is output from the output terminal of the image processing circuit 103. Next, in the clock operation determination unit 302, this output test data and the expected test data generated by the test data generation unit 301 are compared. In FIGS. 10A to 10J, although the output test data (FIG. 10H) in the clock pulse 100 MHz and the expected test data and the expected test data (FIG. 10G) mostly correspond, one part thereof does not correspond. Thereby, the determination in the clock operation determination unit 302 is "NG" (FIG. 10I). When the determination is NG, the test mode may be finished.

When the test of the operating frequency is finished, the finish signal for notifying the finish of the test to the management device 200 and the signal indicating a maximum operating frequency are output from the communication unit 109. The maximum frequency denotes the maximum frequency in which the determination is "OK" among the determination result in the clock operation determination unit 302.

In the management device 200, when the test finish signal is received from the image forming device 100, the operating test information related to the operating frequency measurement in the image forming device 100 is stored in the information storage unit 202. In the toll computing unit 203, the toll imposed on the image forming device 100 is computed on the basis of the operating test information in the image forming device 100. The operating test information is stored in the information storage unit 202. The computed toll is notified to the predetermined communication terminal.

As above, according to the operating frequency measurement unit 108, by allowing the frequency in which the image processing circuit 103 can operate to be measured from the management device 200 through the communication network N, the convenience in the image forming device 100 can be enhanced.

Further, in FIGS. 10A to 10J, to simplify the description, although the case in which the clock pulse is measured at 50 MHz, 100 MHz, and 150 MHz is shown when the frequency of the reference clock signal is 100 MHz, the frequency of the reference clock signal and the measuring frequency are not limited in particular. Because the frequency of the clock pulse can be freely chosen in the clock generation unit 400, the maximum operating frequency of the image processing circuit 103 can be accurately obtained by gradually increasing the frequency with the detailed step such as 1 MHz. In other words, in the mounted state of the actual device, a ceiling of the operating frequency (maximum operating frequency) can be obtained as the operating frequency is freely changed. Further, the operating frequency can be enhanced by removing the amount of margin which is disposed for the production tolerance.

Further, the image processing circuit 103 can be set so as to operate in the smallest frequency of EMI. Further, the embodiment can be structured with a simple structure and a conventional, expensive tester is not necessary to use. Further, without using an expensive processing technique, a cheap C-MOS processing digital circuit can be used in the circuit to be checked.

Next, by the management device 200, the example that the function change of the image processing circuit 103 is conducted through the communication network N and the measurement of the operating frequency is conducted will be described. Further, the structure for conducting the operating test of the image forming device through the communication network, the structure for conducting the function change of the image processing circuit, and the structure for conducting the operating frequency measurement are as shown in FIG. 1, FIGS. 3A to 3E and FIG. 7.

Hereinafter, the function change by the management device 200 and the processing procedure of the operating frequency measurement will be described.

First of all, when the function change of the image processing circuit 103 and the frequency measurement based on the function change are designated from the management device 200, the image processing procedure (the data of the computing parameter and the data of the set value indicating the computing procedure) is sent to the image forming device 100 by the communication unit 109. Thereby, as described above, the function change is conducted in the image processing circuit 103. Further, the input image data and the expected image data (in other words, the image output data which is expected after the image processing), together with the image processing procedure, are sent from the management device 200 to the image processing circuit 103.

Next, on the basis of the above designation, the frequency measurement start signal is input to the image forming device 100, and the image processing circuit 103 operates for the test. In the image processing circuit 103, as the operating frequency is sequentially fluctuated, the image processing is conducted for the input image data and the image data after the image processing is obtained. Next, for each operating frequency, the image data after the image processing and the expected image data are compared, and the frequency in which both of them correspond is determined as an operable frequency. The timing chart related to the measurement of the operating frequency is as shown in FIGS. 10A to 10J. During the normal image processing, the image processing circuit 103 checks whether the frequency is within the operable range or not for each operating frequency, and if the frequency is within the operable range, the frequency within the range is applied to the image processing circuit 103.

Further, the comparison of the image data after the image processing and the expected image data may be conducted by outputting the image data after the image processing and comparing the output image and the expected image. The output image may be a visible material such as a duplex paper, a toner paper, a toner image on a photo conductor.

When the operable frequency is determined in the image processing circuit 103, the determined frequency is notified through the communication network N to the management device 200.

Further, the management toll may be imposed on each user of the image forming device, on the basis of the function change of the image processing circuit, the content of the operating test, the number of tests, the version, and the model information, by the management device 200.

Displacement Correcting Test of Image

Next, as an applicable example of the image processing circuit 103 in FIG. 1, the image processing circuit 103b in which the remote function change can be conducted will be described.

Figure 11:
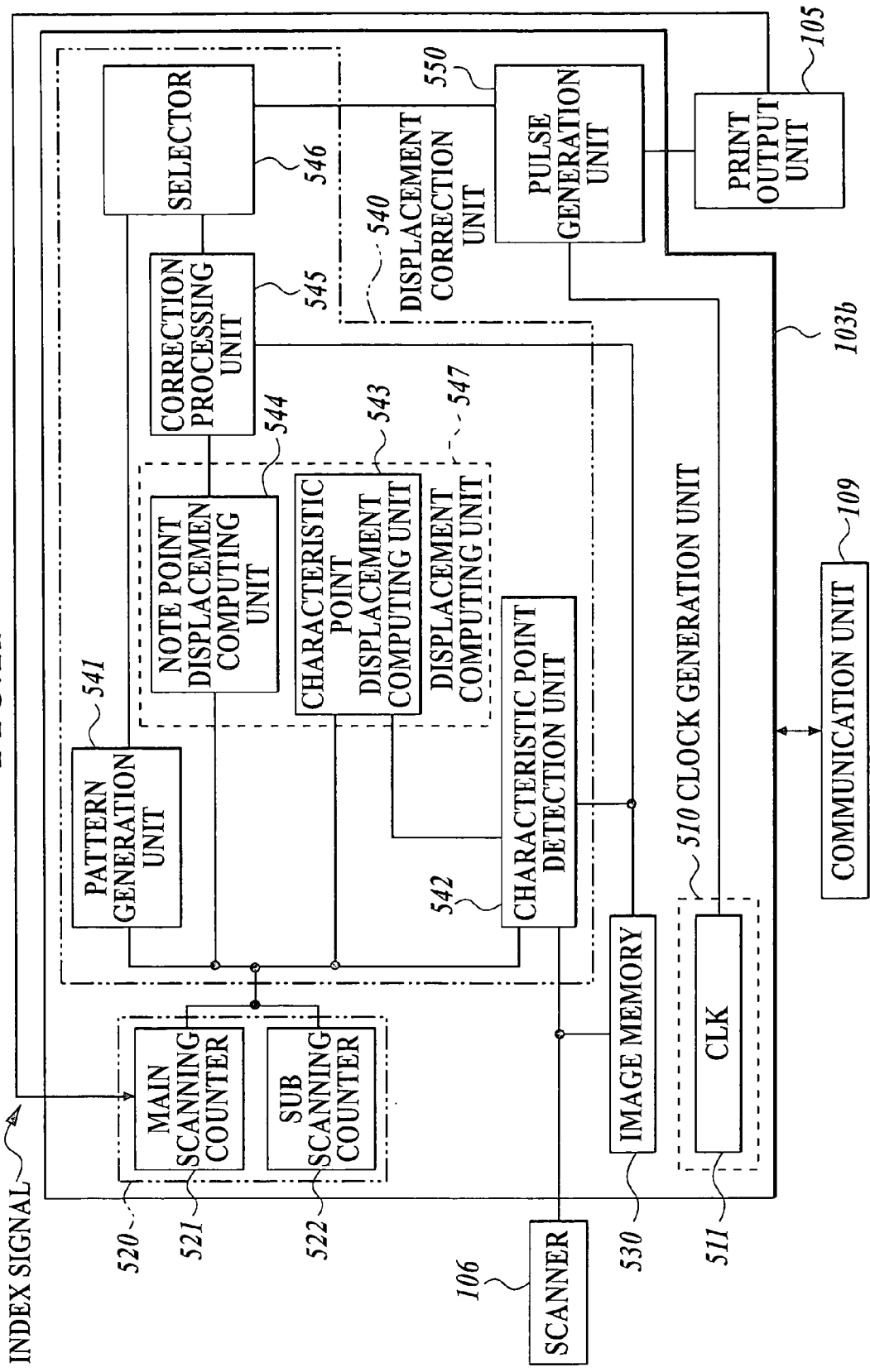
FIG. 11 is a block diagram showing the circuit structure of the image processing circuit capable of conducting the displacement correction of the image.

First of all, the structure of the image processing circuit 103b will be described. The image processing circuit 103b is connected with the scanner 106 and the image forming unit 105, and connected through the communication unit 109 to the management device 200. As shown in FIG. 11, this image processing circuit 103b has a clock generation unit 510, a counter unit 520, an image memory 530, a displacement correction unit 540, and a pulse generation unit 550.

The clock generation unit 510 comprises a reference clock generation unit 511 for generating the reference clock CLK. The counter unit 520 counts the position operated by the laser beam of the image forming in the image forming unit, by the main scanning counter 521 and the sub scanning counter 522. The image memory 530 temporarily stores the image data read by the scanner 106, the data related to the amount of the displacement in each pixel (each note point), and so forth.

The displacement correction unit 540 has a pattern generation unit 541, a characteristic point detection unit 542, a displacement computing unit 547, a correction processing unit 545, and a selector 546.

The pattern generation unit 541 generates the pattern data for forming the test pattern having the characteristic point at the predetermined position of the print sheet when the start signal for designating the test start is input from the communication unit. The characteristic point detection unit 542 detects the position (characteristic point) of the test pattern, from the image data obtained by reading the print sheet in which the test pattern is printed.

The displacement computing unit 547 has a characteristic point displacement computing unit 543 and a note point displacement computing unit 544. The characteristic point displacement computing unit 543 detects the displacement with respect to the position to be output in the characteristic point which is detected by the characteristic point detection unit 542. The note point displacement computing unit 544 computes the amount of the displacement in each pixel (each note point) by the displacement of the characteristic point detected by the characteristic point displacement unit 543.

The correction processing unit 545 corrects the displacement in each pixel and generates the corrected image data, on the basis of the amount of the displacement in each pixel. The amount of the displacement is computed by the note point displacement computing unit 544. The selector 546 chooses either the data of the test pattern which generates in the pattern generation unit 541 or the image data generated in the correction processing unit 545.

The pulse generation unit 550 generates PWM (Pulse Width Modulation) for the image processing in the image forming unit 105, on the basis of the data of the test pattern generated in the pattern generation unit 541 or the image data generated in the correction processing unit 545.

Next, the operation in the image processing circuit 103b of FIG. 11 will be described. With reference to the flow chart of FIG. 12, the displacement correction·the output processing conducted in the image processing circuit 103b will be described.

When the start signal for designating the test start is input from the management device 200 through the communication network N to the image processing circuit 103b (step S11), first of all, the pattern data for outputting the predetermined test pattern on the print sheet is generated in the pattern generation unit 541. This pattern data passes the selector 546, and PWM corresponding to the pattern data which is generated in the pattern generation unit 541 is generated in the pulse generation unit 550. In the image forming unit, the image of the test pattern is printed out on the print sheet on the basis of PMW signal generated in the pulse generation unit 550 (step 12).

Figure 13:
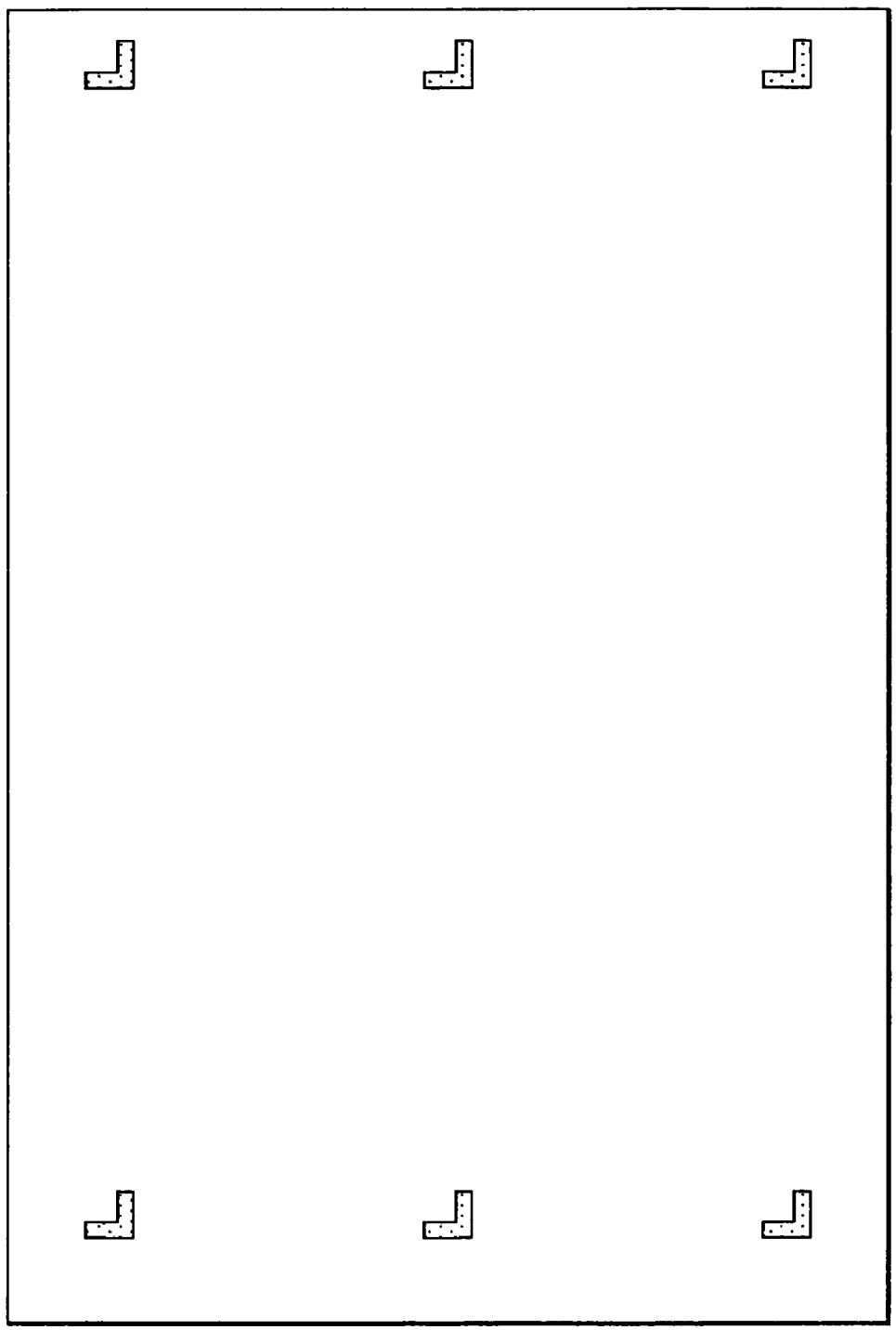
FIG. 13 is a view showing an example of the test pattern which is printed in the print sheet (duplex paper)
Figure 15:
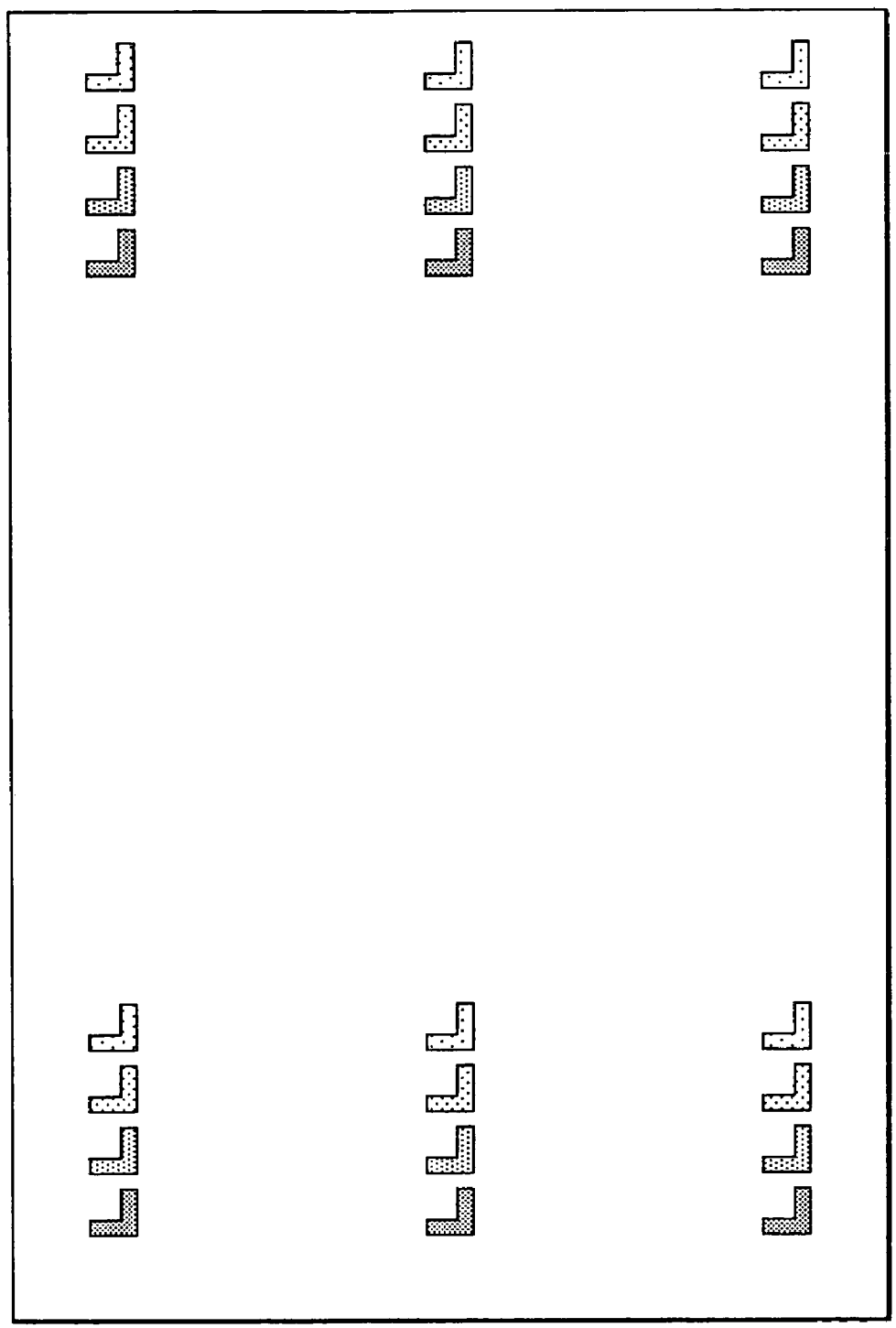
FIG. 15 is a view showing an example of the test pattern which is printed in the print sheet (duplex paper)

An example of the print sheet in which the image of this test pattern is printed is shown in FIG. 13. In FIG. 13, the reversed L test pattern is printed at 6 positions of the upper left, the upper middle, the upper right, the lower left, the lower middle, and the lower right. Although the number of the test pattern printed on the print sheet is not limited in particular, at least, it is preferable that the vicinity of four ends on the print sheet is included. In FIGS. 14A and 14B, the enlarged view of the test pattern shown in FIG. 13 is shown. Here, the inside angle of the reversed L is defined as a characteristic point. Further, in case of the monochrome image forming, the test pattern is disposed like FIG. 13. But in case of the color image forming, the test pattern of the forming color (for example, YMCK) is disposed like FIG. 15.

Next, the print sheet in which the test pattern is formed is automatically carried to the scanner and disposed on the copy table. The image of the test pattern on the print sheet is read by the scanner (step S13). Next, the in the characteristic point detection unit 542, the characteristic point of the test pattern is extracted from the image data read by the scanner (step S14)

Further, in the step S14, to extract the characteristic point of the test pattern, for example, as shown in FIG. 14B, the pattern matching is conducted for the image data of 9 pixels (3 pixels of the sub scanning direction ×3 pixels of the main scanning direction) Further, if the number of the targeted pixels of the pattern matching is increased, the accuracy for extracting the characteristic point is improved.

When the characteristic point of the test pattern is extracted, the amount of the displacement between the position where the characteristic point originally positions if the distortion or the like does not exist in the image forming and the characteristic point is actually extracted is computed for each main scanning direction and the sub scanning direction (step 15). The computed amount of the displacement is stored in the image memory 530.

Figure 16:
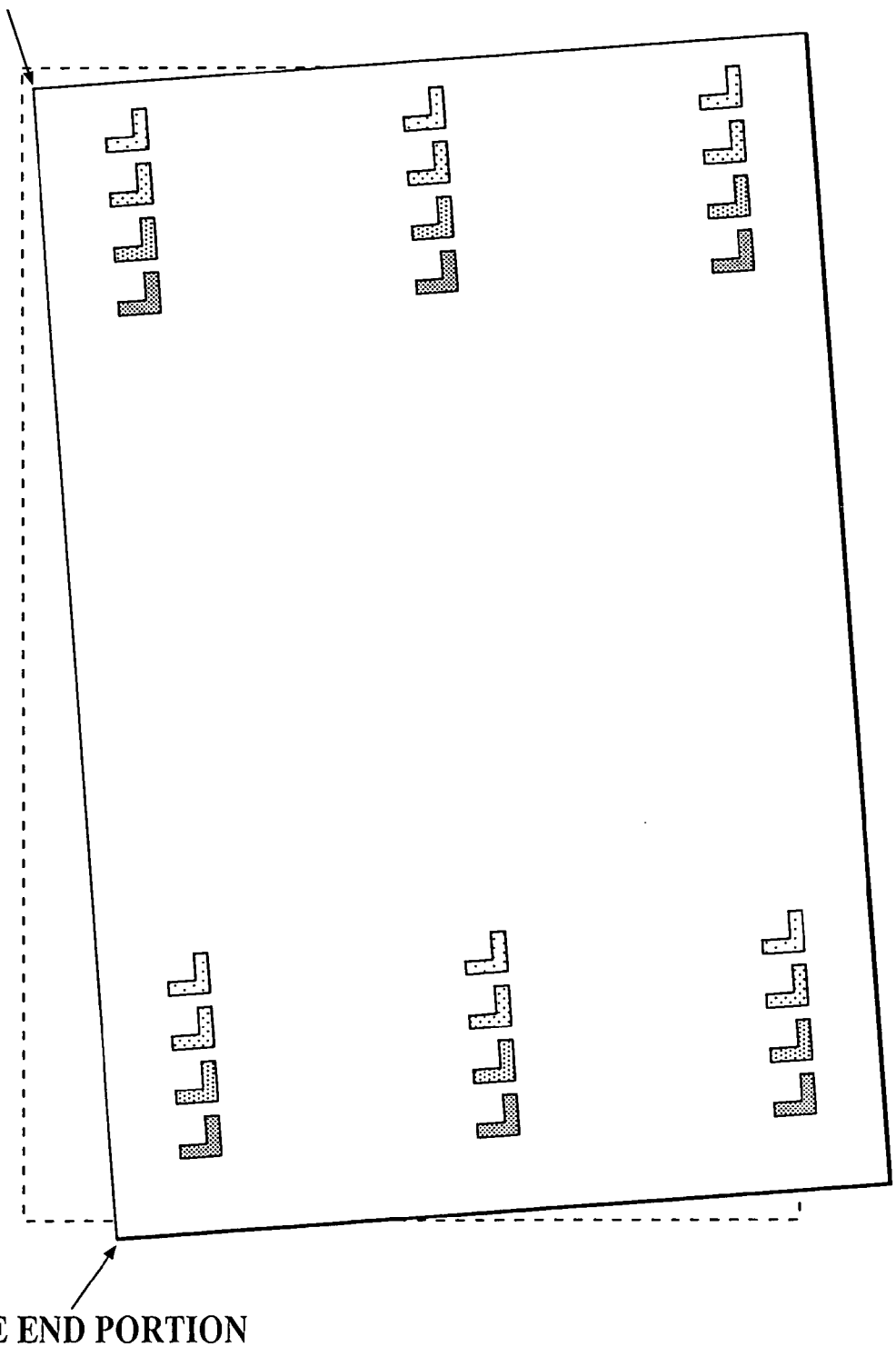
FIG. 16 is a view showing the displacement of the image when the print sheet (duplex paper) in which the test pattern is printed is read by the scanner.

In step S15, the amount of the displacement must be computed for all of the characteristic points of the test pattern. The reason is that when the test pattern of the print sheet is read by the scanner, as shown in FIG. 16, the overall image is displaced, obliqued and so forth. Hereinafter, the method for computing the amount of displacement in each characteristic point will be described.

$(\Delta X(c, i, j), \Delta Y(c, i, j))$=[the coordinate of the characteristic point (color c, position (i, j) read by the scanner)−[the coordinate of the characteristic point (color c, position (i, j) where the characteristic point originally positions) is defined. Here, c=Y (yellow), M (magenta), C (cyan), K (black), i=0-m, and j=0-m.

Like the image forming device 100 in the embodiment, in case of the image forming device of laser type, because it is considered that the difference of color does not cause the difference of the extension in the sub scanning direction, this characteristic is used. When the 2 characteristic points used for the displacement correction are (K, 0, 0) and (K, 0, n), in each characteristic point (c, i, j), $\Delta X(K, 0, 0)+(i/m)\times\{\Delta X(K, 0, n)-\Delta X(K, 0, 0)\}$ must be deducted from $\Delta X(c, i, j)$ in the main scanning direction, and $\Delta Y(K, 0, 0)+(j/m)\times\{\Delta Y(K, 0, n)-\Delta Y(K, 0, 0)\}$ must be deducted from $\Delta Y(c, i, j)$ in the sub scanning direction.

Therefore, when the image output is actually conducted, in each characteristic point (c, i, j), the amount of the displacement $\delta X(c, i, j)$ in the main scanning direction and $\delta Y(c, i, j)$ in the sub scanning direction are respectively shown in the following formulas (1) and (2).

$$\delta X(c, i, j) = \Delta X(c, i, j) - \Delta X(K, 0, 0) + (i/m)\times\{\Delta X(K, 0, n) - \Delta X(K, 0, 0)\} \quad (1)$$

$$\delta Y(c, i, j) = \Delta Y(c, i, j) - \Delta Y(K, 0, 0) + (j/m)\times\{\Delta Y(K, qj0, n) - \Delta Y(K, 0, 0)\} \quad (2)$$

When the amount of the displacement in each characteristic point is computed, in the note point displacement computing unit 544, the amount of the displacement in each note point is computed by using the amount of the displacement in each of these characteristic points and putting each pixel as a characteristic point, and stored in the image memory 530 (step 16). Hereinafter, with reference to FIG. 17, the method for computing the amount of the displacement in each pixel will be described.

Figure 17:
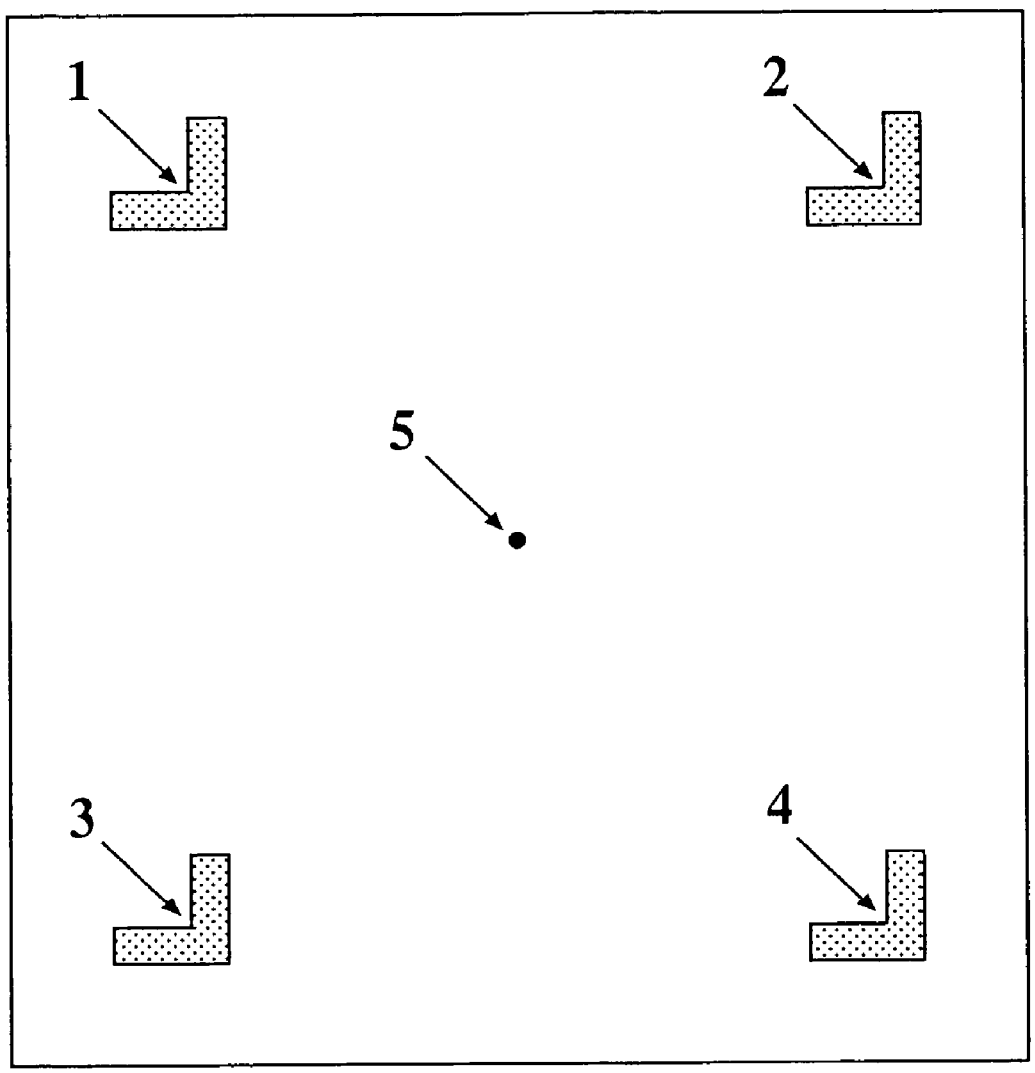
FIG. 17 is a view for describing the method for computing the amount of the displacement in each pixel (each note point)

In FIG. 17, the amount of the displacement of the pixel of the note point 5 can be computed on the basis of the amount of the displacement of the characteristic points 1, 2, 3 and 4 of the test pattern which positions around the pixel. Further, although it is not limited that the characteristic point exists around the note point, the amount of the displacement can be computed by assuming the amount of the displacement even if a plurality of the characteristic points exist on one side.

The coordinate of the note point 5 is (x, y), the color is c, and the coordinates of the characteristic points 1 to 4 are defined hereinafter.

The coordinate of the characteristic point 1=(X(c, i, j), Y(c, i, j))

The coordinate of the characteristic point 2=(X(c, i+1, j), Y(c, i+1, j))

The coordinate of the characteristic point 3=(X(c, i, j+1), Y(c, i, j+1))

The coordinate of the characteristic point 4=(X(c, i+1, j+1), Y(c, i+1, j+1))

In this case, the amount of the displacement $\delta X$ and $\delta Y$ in the note point 5 can be obtained by the following interpolation.

$$\delta x = \delta X(c, i, j) + \{x - X(c, i, j)\}\times\{\delta X(c, i+1, j) - \delta X(c, i, j)\}/\{X(c, i+1, j) - X(c, i, j)\}$$

$$\delta y = \delta Y(c, i, j) + \{y - Y(c, i, j)\}\times\{\delta Y(c, i, j+1) - \delta Y(c, i, j)\}/\{Y(c, i, j+1) - Y(c, i, j)\}$$

Further, the method for computing the amount of the displacement in each note point by using the amount of the displacement of the characteristic point of the test pattern is not limited to the method shown here.

If the image forming is actually conducted on the basis of the amount of the displacement in each note point (step S17; YES), for the targeted image data of the image forming which is stored in the image memory 530, the displacement correction is conducted on the basis of the amount of the displacement which is computed in step S16 (step S18), and the corrected image data is generated.

Next, on the basis of the image data in which the displacement correction is conducted, PWM signal for the image forming is generated, and on the basis of PMW signal, the print out is conducted (step S19). When the print out is finished, the finish signal for notifying the finish of the test to the management device 200 is output from the communication unit 109 and this displacement correction output processing is finished.

In the management device 200, when the test finish signal is received from the image forming device 100, the information related to the operating test of the displacement correction in the image forming device 100 is stored in the information storage unit 202. In the toll computing unit 203, the toll imposed on the image forming device 100 is computed on the basis of the operating test information in the image forming device 100, and the computed toll is notified to the predetermined communication terminal.

Figure 12:
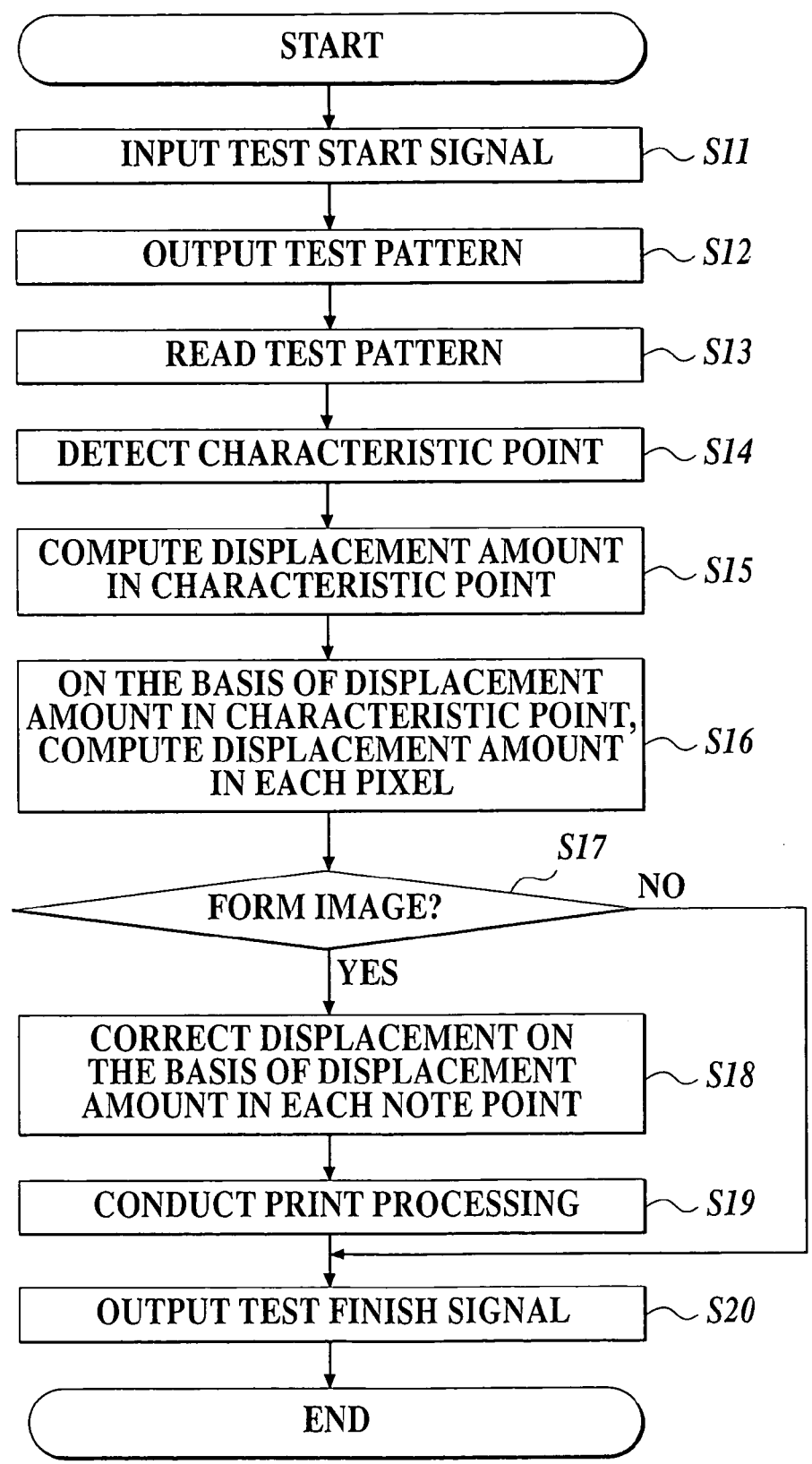
FIG. 12 is a flowchart showing the displacement correction output processing which is conducted in the image processing circuit of FIG. 11.

Further, if the processing shown in FIG. 12 is conducted in each color (for example, 4 colors of YMCK) used in the image forming, because the image of each color is formed at the original position, the color displacement is dissolved.

As above, according to the image processing circuit 103, by allowing the displacement of the image data to be corrected from the management device 200 through the communication network N, the convenience in the image forming device 100 is improved.

Further, the described content in the embodiment can be modified within the scope of the invention.

The entire disclosure of tokugan 2003-147900 filed on May 26, 2003 including specification, claims, drawings and summary are incorporated herein by reference in its entirety.

What is claimed is:

1. A management system of an image forming device, which is structured by the image forming device and a management device for managing the image forming device through a communication network;
the management device comprising a communication unit for sending a data of a computing parameter for conducting an image processing and a data of a set value indicating a computing procedure of the image processing, to the image forming device;
the image forming device comprising:
an image processing circuit for conducting the predetermined image processing for an image data;
an image forming unit for conducting an image forming on the basis of the image data in which the image processing is conducted; and
a read unit for reading an image formed by the image forming unit;
the image processing circuit comprising:
a plurality of computing modules for conducting the predetermined image processing;
a plurality of output storage circuits connected with each of output stages of the computing modules, the output storage circuits reading and storing an output data from each of the computing modules on a timing of a signal change of a clock signal;
a computing parameter memory circuit for memorizing the data of the computing parameter sent from the management device;
a computing procedure memory circuit for memorizing the data of the set value indicating the computing procedure sent from the management device; and
a selector connected with each of input stages of the computing modules, the selector selectively choosing a data among from a targeted image data of the image processing, the data indicating the computing parameter, and each of the output data of the output storage circuits, in accordance with the set value of the computing procedure stored in the computing procedure memory circuit, and outputting a chosen data to the computing module connected with rearward stages;
wherein in the image forming device, by the image processing circuit, the image processing is conducted for an image data for test on the basis of the data of the computing parameter sent from the management device and the data of the set value indicating the computing procedure, and by the image forming unit, the image forming is conducted on the basis of the image data in which the image processing is conducted, and by an image read unit, a formed image is read, and by comparing a read image and a predetermined expected image, a comparison result is sent to the management device.

2. The management system of claim 1, wherein the image forming unit comprises a photo conductor, and the image formed by the image forming unit is a toner image formed on the photo conductor.

3. The management system of claim 2, wherein the read unit reads the toner image on the photo conductor.

4. The management system of claim 1, wherein the image forming unit conducts the image forming on a duplex paper on the basis of the image data in which the image processing is conducted.

5. The management system of claim 1, wherein:
the image forming device further comprises an operating frequency measurement unit to measure an operating frequency of the image processing circuit, the operating frequency measurement unit comprising:
a clock generation unit to generate a clock signal having an optional frequency, for operating the image processing circuit; and
a clock operation determination unit to determine whether the image processing circuit normally operates by the clock signal generated by the clock generation unit, and wherein:
the image forming device further comprises a communication unit to send the management device a determination result determined by the clock operation determination unit.

6. The management system of claim 1, wherein the image processing circuit further comprises:
a characteristic point detection unit to detect a characteristic point of the image read by the read unit;
a displacement computing unit to compute an amount of a displacement of the image from the characteristic point of the image detected by the characteristic point detection unit; and
a correction processing unit to correct a displacement of an image to be printed out on the basis of the amount of the displacement computed by the displacement computing unit, and wherein:
the image forming unit prints out the image whose displacement is corrected by-the correction processing unit.

* * * * *